United States Patent [19]

Johnston et al.

[11] E Patent Number: Re. 32,172

[45] Reissued Date of Patent: Jun. 3, 1986

[54] ENDPOINT DETECTOR

[75] Inventors: James D. Johnston, Warren, N.J.; Lori F. Lamel, Cambridge, Mass.; Lawrence R. Rabiner; Aaron E. Rosenberg, both of Berkeley Heights, N.J.; Jay G. Wilpon, Warren, N.J.

[73] Assignee: AT&T Bell Laboratories, Murray Hill, N.J.

[21] Appl. No.: 694,832

[22] Filed: Jan. 25, 1985

Related U.S. Patent Documents

Reissue of:

[64] Patent No.: 4,370,521
Issued: Jan. 25, 1983
Appl. No.: 218,207
Filed: Dec. 19, 1980

[51] Int. Cl.[4] ..... G10L 1/00

[52] U.S. Cl. ..... 381/46

[58] Field of Search ..... 381/41–48, 381/110; 364/513, 513.5; 370/80, 81; 375/30, 31, 34, 99

[56] References Cited

U.S. PATENT DOCUMENTS

| | | | |
|---|---|---|---|
| 3,909,532 | 9/1975 | Rabiner et al. | 179/1 SC |
| 4,028,496 | 6/1977 | La Marche et al. | 179/1 SC |
| 4,057,690 | 11/1977 | Vagliani et al. | 179/1 SC |
| 4,158,749 | 6/1979 | Deman et al. | 179/1 SC |
| 4,277,645 | 7/1981 | May | 179/1 SC |

*Primary Examiner*—E. S. Matt Kemeny
*Attorney, Agent, or Firm*—Jack S. Cubert

[57] ABSTRACT

An arrangement for endpoint detection improves speech recognition accuracy and lowers rejection rates by developing an ordered list of endpoint candidates. A triple thresholding technique defines energy signal pulses. The energy pulses are combined according to predetermined criteria to form the endpoint candidates.

22 Claims, 26 Drawing Figures

ENDPOINT DETECTOR

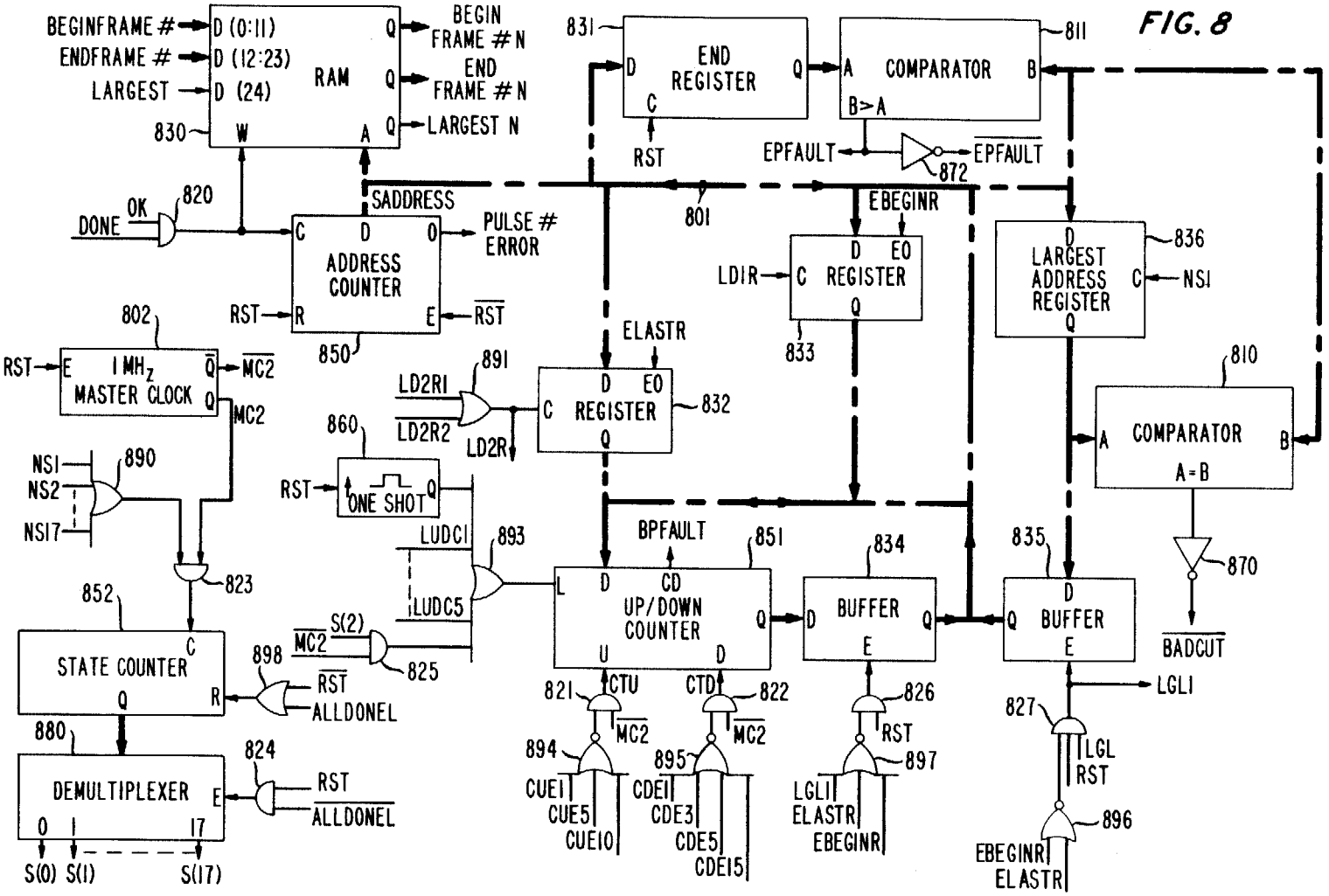
FIG. 8
COMPARATOR
A=B
BADCUT
LARGEST ADDRESS REGISTER
NSI
BUFFER
LGLI
LGL
RST
EBEGINR
ELASTR
COMPARATOR
B>A
EPFAULT
END REGISTER
RST
EO REGISTER
LDIR
BUFFER
CD UP/DOWN COUNTER
BPFAULT
CTD
CTU
MC2
CDEI
CDE3
CDE5
CDEI5
CUEI
CUE5
CUEI0
ELASTR
EO REGISTER
LD2R
LD2RI
LD2R2
ONE SHOT
LUDCI
LUDC5
S(2)
ALLDONEL
BEGIN FRAME # N
END FRAME # N
LARGEST N
RAM
D (0:11)
D (12:23)
D (24)
BEGINFRAME #
ENDFRAME #
LARGEST
SADDRESS
PULSE # ERROR
ADDRESS COUNTER
OK
DONE
1 MHz MASTER CLOCK
NSI
NS2
NSI7
STATE COUNTER
DEMULTIPLEXER
S(17)
S(I)
S(0)

FIG. 12
STATE 5
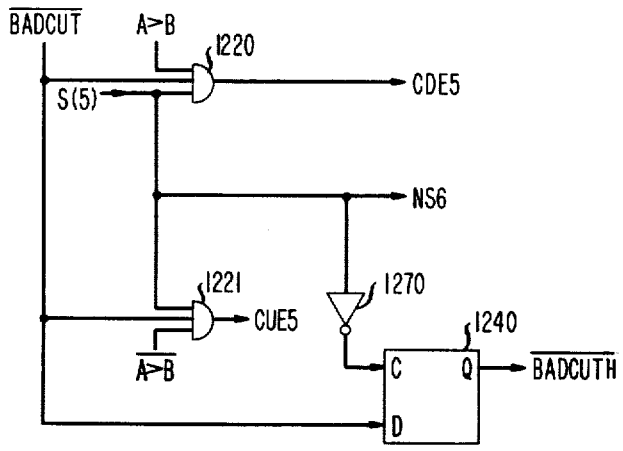
STATE 6
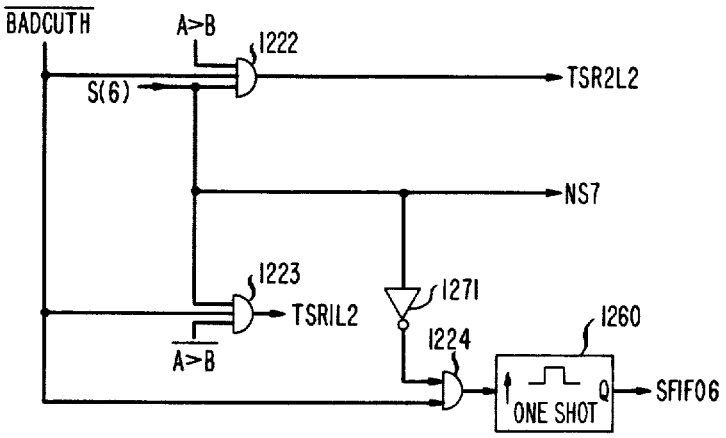

ENDPOINT DETECTOR

Matter enclosed in heavy brackets [ ] appears in the original patent but forms no part of this reissue specification; matter printed in italics indicates the additions made by reissue.

BACKGROUND OF THE INVENTION

Our invention relates to automatic speech recognition and, more particularly, to arrangements for detecting the endpoints or boundaries of the speech portion of an utterance.

Automatic speech recognition is the focus of vigorous research toward enabling voice communication between man and machine. Isolated word recognition systems have been developed which require a pause between utterances. Typically, such systems have a reference vocabulary of words stored as digital templates. An input utterance is converted to digital form and compared to the reference templates for identification. In order to efficiently process the matching of an utterance to a reference template, it is first necessary to distinguish speech sounds from non-speech sounds in the input utterance. Outside a carefully controlled laboratory environment, however, it is difficult to accurately locate the endpoints of the speech sounds. Background noise, such as found on telephone lines, may be confused with speech sounds of low amplitude. In the word "three", for example, the "th" fricative is unvoiced and is of low amplitude. On the other hand, higher amplitude non-speech sounds must not be identified as speech. Clicks and pops in the transmission system and comparable speaker induced artifacts may have a higher amplitude than some fricatives, but contain no information useful for speech processing. Similarly, it may be difficult to distinguish artifacts from stop consonant releases. In the word "eight", for example, the voiced phonetic sound "eigh" is followed by a slight pause before the consonant sound "t" is released.

A prior endpoint detector, disclosed in U.S. Pat. No. 3,909,532, issued Sept. 30, 1975 to Rabiner et al and assigned to the same assignee, uses an energy measurement of digitally encoded speech. The beginning of the speech portion of an utterance is detected when the energy exceeds a predetermined threshold value for a fixed interval of time. Likewise, the end of the speech portion is detected when the energy drops below the threshold for another fixed interval of time. The endpoint detector may, however, omit speech sounds which fall below the threshold.

The article by L. R. Rabiner and M. R. Sambur entitled, "An Algorithm for Determining the Endpoints of Isolated Utterances", appearing in the Bell System Technical Journal, Vol. 54, page 297, 1975, describes an improved endpoint detector for isolated word recognition. The beginning of the speech portion of an utterance is defined as the point where the energy first exceeds a lower threshold if it then exceeds an upper threshold before falling below the lower threshold. The end of the speech portion is detected at the point where the energy drops below the lower threshold. The endpoints are then adjusted using a zero crossing measurement for detecting unvoiced speech. This improved endpoint detector may not, however, accurately discriminate against non-speech sounds which exceed the upper threshold.

In U.S. Pat. No. 4,032,710, issued June 28, 1977 to Martin et al, an endpoint detector extracts three feature signals from isolated word input. Each feature signal comprises selected spectral components of the input speech. The first feature signal sets the starting point of the speech portion where the energy of the selected components exceeds a predetermined threshold. The ending point is set where the energy falls below the threshold. The first feature signal persists for a lag time to account for stop gaps within words. The second and third feature signals, which have spectral components found in voiced and unvoiced speech, but not in breath noise, are used to adjust the endpoint estimates obtained from the first feature signal. The feature signal endpoint detector is not, however, adapted to accurately determine the endpoints when an artifact exceeds the predetermined energy threshold within the lag time of the first feature signal.

It is thus an object of the invention to provide an improved arrangement for determining the endpoints of the speech portion of an utterance containing artifacts and background noise comparable to the energy levels of weak speech sounds.

SUMMARY OF THE INVENTION

We have discovered that utterances may be more accurately identified and rejected less often by supplying a speech recognizer with a plurality of likely endpoint candidate signals instead of only a single set of endpoint signals, as in the prior art. A plurality of endpoint candidate signals permits feedback between the endpoint detector and the speech recognizer. If an utterance cannot be identified confidently with a given set of endpoint signals, other endpoint candidate signals may be tried in the recognizer. Repetition of the utterance is required only if the entire plurality of endpoint candidate signals is exhausted without successful identification.

The invention is directed to endpoint detection arrangements for word recognition systems. An input utterance is encoded to develop digital output signals. The digital output signals are used to generate energy level signals. The energy level signals are compared to amplitude thresholds to develop energy signal pulses. The energy signal pulses are combined according to predetermined criteria. The beginning and end of the combined pulses form signals which define endpoint candidates.

In an embodiment illustrative of the invention, an input utterance is digitally encoded by using, for example, adaptive differential pulse code modulation (ADPCM). The encoded input is divided into frames. A preprocessor develops energy level signals from the framed, encoded input. A second level preprocessor normalizes the energy level signals. A triple thresholding technique is used to extract energy signal pulses from the normalized energy level signals. The energy signal pulses represent potential information bearing components of the encoded input. The endpoints of the energy signal pulses are adjusted according to the rise or fall time of each energy signal pulse. The boundaries of the input utterance are checked for the presence of speech energy. Energy pulses of less than a specified amplitude or duration are eliminated. Energy pulses separated by more than a predetermined time from the pulse having the maximum energy are eliminated. Energy pulses separated by less than a specified time are combined according to predetermined criteria with the largest energy signal pulse. The endpoints of the combined pulses define endpoint candidates. The endpoint candidates are arranged in preferential order. The ordered candidates are made available to a speech recognizer. Endpoint candidates are sent to the recognizer until the test utterance is identified as one of a set of stored reference templates. If the test utterance cannot be identified with confidence, the utterance must be repeated and new endpoints determined.

BRIEF DESCRIPTION OF THE DRAWING

FIG. 8 shows a detailed block diagram of a smoother control that may be used in the endpoint detector of FIG. 1;

FIGS. 10, 11, 12, 13 and 14 show detailed block diagrams of a state control that may be used in the endpoint detector of FIG. 1;

DETAILED DESCRIPTION

Figure 1:
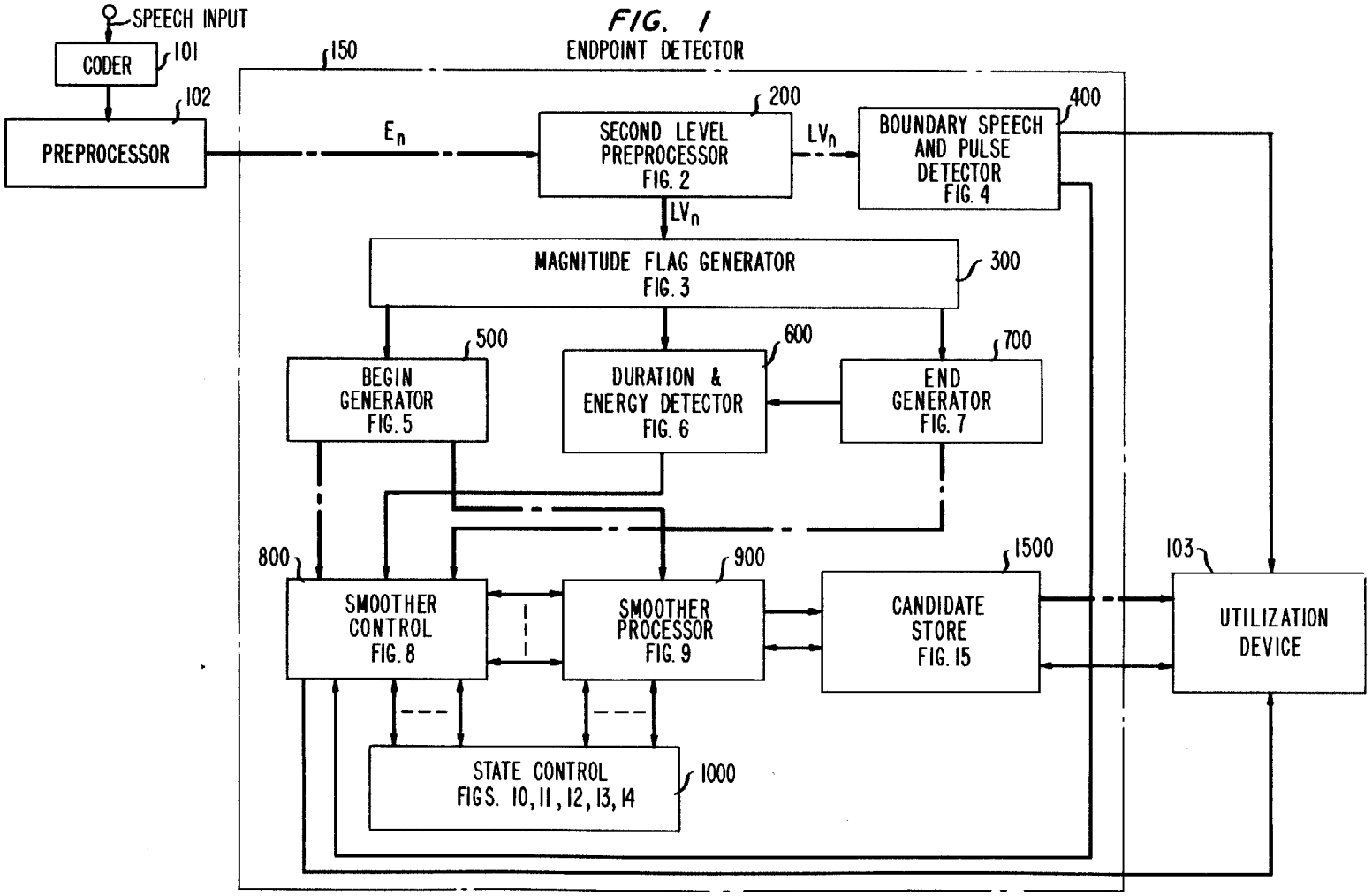
FIG. 1 shows a general block diagram of an endpoint detector illustrative of the invention.

FIG. 1 shows a general block diagram of an endpoint detector illustrative of the invention. The system of FIG. 1 may be used to provide a set of endpoint candidate signals to a speech recognizer responsive to an input utterance. Alternatively, the endpoint detector arrangement may comprise a general purpose computer, for example, adapted to perform the signal processing functions described with respect to FIG. 1 in conjunction with a read only memory (ROM).

Speech is applied to the input of coder 101. Coder 101 digitally encodes the speech input using techniques well known in the art, such as pulse code modulation (PCM), companded PCM (e.g., mulaw or Alaw) or adaptive differential pulse code modulation (ADPCM). A suitable ADPCM coder is described in detail in aforementioned U.S. Pat. No. 3,909,532 and in the article by P. Cummiskey, N. S. Jayant, and J. L. Flanagan, entitled "Adaptive Quantization in Differential PCM Coding of Speech," appearing in the Bell System Technical Journal, Vol. 52, page 1105, September 1973. The digitized speech output of coder 101 is applied to preprocessor 102.

Preprocessor 102 pre-emphasizes and blocks the digitized speech codes from coder 101 into overlapping frames and forms signals representative of the speech energy level of each frame. A prior art preprocessor, described in detail in aforementioned U.S. Pat. No. 3,909,532, may be adapted as is well known in the art, to determine the speech energy in each frame in accordance with Eq. (1).

In one embodiment of this invention, the input speech is bandpass filtered from 100 to 3200 Hz and sampled at 6.67 kHz in coder 101. The samples are blocked into overlapping frames. Each frame has 300 samples. Successive frames are offset by 100 samples or 15 ms. The input utterance is defined by the sequence of frames n=1 to L. L may be, for example, 512. Preprocessor 102 forms signals $E_n$ representative of the speech energy level of the pre-emphasized, blocked speech:

$$E_n = \sum_{i=0}^{N-1} s_n(i)^2 \quad n = 1,2,\ldots,L \tag{1}$$

where sample $s_n(i)$ is the pre-emphasized, blocked speech of frame n, and N, e.g., 300, is the number of samples per frame. A further detailed description of energy measurement methods appears in the article by R. W. Schafer and L. R. Rabiner, "Parametic Representations of Speech," Proceedings of IEEE Speech Recognition Symposium, April 1974, pages 99–150.

In accordance with the invention, signals $E_n$ for the sequence of frames n=1 to L are applied to endpoint detector 150.

Second level preprocessor 200 converts signals $E_n$ to a sequence of energy level signals $LV_n$, N=1, L. Each energy level signal $LV_n$ is a normalized, integer value representation of signal $E_n$ in decibels.

Magnitude flag generator 300 outputs flag signals $F_1$, $F_2$, $F_3$, and $F_4$ responsive to the amplitude of energy level signal $LV_n$. A flag signal is generated when an energy level signal $LV_n$ exceeds a particular predetermined energy threshold. A flag signal is inhibited when an energy level signal $LV_n$ falls below this predetermined threshold.

Boundary error, speech and largest pulse detector 400 checks the sequence of energy level signals $LV_n$ for the presence of speech on the boundaries of the input utterance. If either $LV_1$ or $LV_L$ is above a predetermined energy threshold, an error signal is generated. The input utterance is also analyzed to assure that speech is in fact present and to detect the frame which has the largest energy level.

Begin generator 500, detects the frame in which speech information begins. The designated beginning frame is modified, if necessary, to account for breath noise. Similarly, end generator 700 detects the frame in which speech information ends. The designated ending frame is modified, if necessary, to account for breath noise.

Minimum duration and energy detector 600 detects sequences of energy level signals $LV_n$ which exceed a prescribed amplitude for at least a predetermined period of time. Each sequence of energy level signals, called an energy signal pulse, is defined by the frames in which it begins and ends. A given input utterance may comprise a plurality of energy signal pulses.

In smoother control 800, smoother processor 900 and state control 1000, the energy signal pulse which contains the highest amplitude energy level signal is detected. This energy signal pulse is called the largest energy signal pulse. The largest energy signal pulse is combined with other energy signal pulses separated by less than a predetermined number of frames to form a single energy signal pulse of larger duration called a smoothed energy signal pulse. The smoothed energy signal pulse is used to form a plurality of endpoint candidate signals. Each endpoint candidate signal comprises a beginning frame signal and an ending frame signal which are probable endpoints of the speech portion of the applied input utterance.

Endpoint candidate signals are stored in candidate store 1500. Utilization device 103 is adapted to request endpoint candidate signals from candidate store 1500. Utilization device 103 may be speech recognition apparatus utilizing endpoint estimates in the recognition process.

The operation of the endpoint detection apparatus, described in detail below with reference to FIGS. 2 through 15, assumes for purposes of illustration an input utterance comprising at least five energy signal pulses. Two energy signal pulses precede the largest energy signal pulse and two energy signal pulses succeed the largest energy signal pulse.

Figure 2:
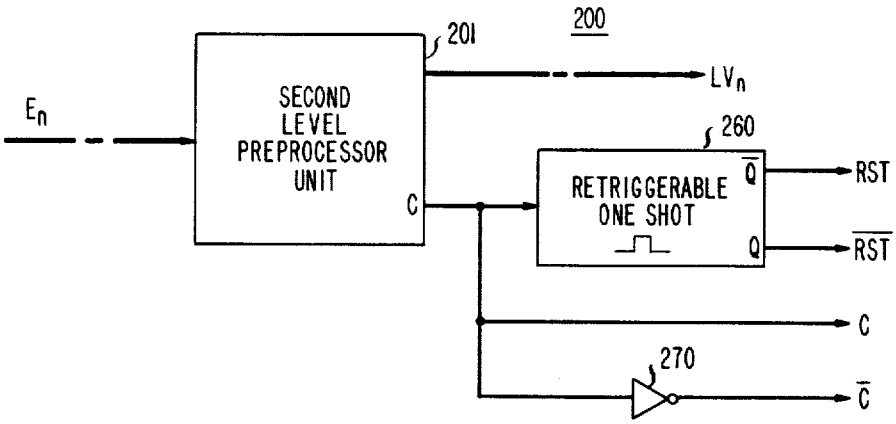
FIG. 2 shows a detailed block diagram of a second level preprocessor that may be used in the endpoint detector of FIG. 1.

In unit 201 of second level preprocessor 200 of FIG. 2, each signal $E_n$ is converted to an integer value in decibels, $LV_n$, according to the equation:

$$LV_n=[10 \log_{10}E_n+0.5],\ n=1,L \tag{2}$$

where [argument] denotes the greatest integer less than or equal to the argument.

In unit 201, the number of $LV_n$ having the minimum value $LV_{min}$, is subtracted from each member $LV_n$ to yield, $LV_n$, a normalized energy level array:

$$LV_n=LV_n-LV_{min},\ n=1,L \tag{3}$$

Another normalization is performed in unit 201 to obtain the energy level signal $LV_n$:

$$LV_n=LV_n-LV_{mode},\ n=1,L \tag{4}$$

where $LV_{mode}$ is the mode of a histogram of the lowest ten values of $LV_n$. If $LV_n-LV_{mode}$ is less than zero, $LV_n$ is set to zero.

Unit 201 may be a general purpose computer adapted to process signals $E_n$ in accordance with equations (2), (3) and (4) as determined by signals from a read only memory (ROM) included therein. Unit 201 may be, for example, a Nova 3 microprocessor made by Data General Corporation. The ROM arrangement for controlling the signal processing defined in equations (2), (3) and (4) is set forth in Fortran language form in Appendix 1.

FIGS. 16 through 26 show waveforms which illustrate timing operations in the circuits of FIGS. 1 through 15. True signals in FIGS. 16 through 26 are indicated by the portions of the waveforms which are above the baseline.

Unit 201 supplies a clock pulse C for each frame n in the input utterance. Clock pulse C is illustrated by waveform 1601 in FIG. 16. Clock pulse C is applied to inverter 270 in FIG. 2 to generate inverse clock pulse $\overline{C}$. Clock pulse C is also applied to retriggerable one-shot 260 to generate reset signal RST (waveform 1602) and inverse reset signal $\overline{RST}$ at time $T_1$. One-shot 260 is selected to have a period greater than the period of the clock. Thus, signal RST remains low until after the end of the input utterance, that is, after clock pulse C has stopped at time $T_2$ in FIG. 16. One-shot 260 may be, for example, an SN74122 type integrated circuit made by Texas Instruments, Corporation.

Figure 3:
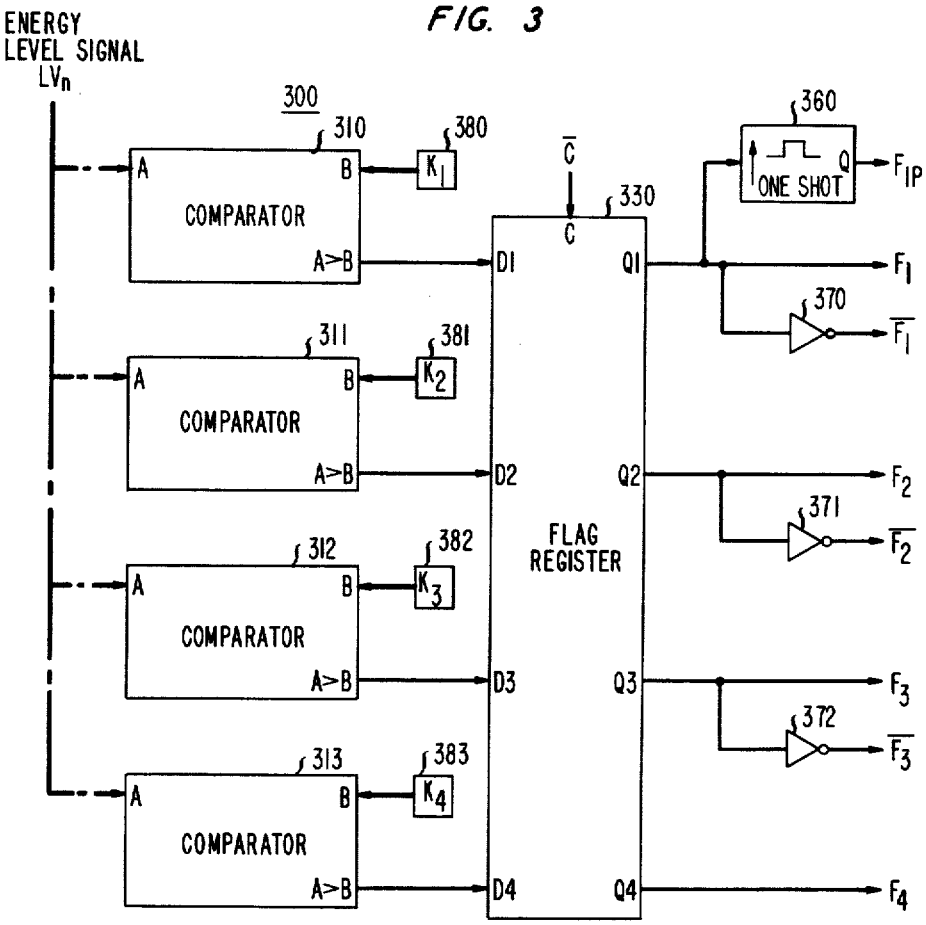
FIG. 3 shows a detailed block diagram of a magnitude flag generator that may be used in the endpoint detector of FIG. 1.

Referring to FIG. 3, magnitude flag generator 300 receives energy level signals $LV_n$, n=1,L, from second level preprocessor 200. Signal $LV_n$ is applied simultaneously to the A inputs of magnitude comparators 310, 311, 312, and 313. A binary code representing a constant speech energy amplitude $K_1$ is applied to the B input of magnitude comparator 310. Constant signal $K_1$, for example, may be a signal corresponding to an amplitude of 3 dB. If energy level signal $LV_n$ is greater than amplitude signal $K_1$, magnitude comparator 310 generates a true signal at output A>B at time $T_1$ (waveform 1702 of FIG. 17).

Similarly, signal $LV_n$ is compared to constant amplitude signals $K_2$, $K_3$ and $K_4$, in magnitude comparators 311, 312, and 313. Signal $K_2$, for example, may correspond to 8 dB, signal $K_3$ may correspond to be 5 dB, and signal $K_4$ may correspond to 15 dB. True signals from the A>B outputs of magnitude comparators 310, 311, 312 and 313 are applied to flag register 330. Flag register 330 may be, for example, a Texas Instruments type SN74174 register circuit.

Constant signals $K_1$, $K_2$, $K_3$ and $K_4$ may be supplied to the magnitude comparators by generator means 380, 381, 382, and 383 well known in the art. Each generator means may be, for example, a binary switch appropriately connected to a resistor network between a constant voltage source and ground. The switch may then be set to a voltage value corresponding to the binary number representation of the selected threshold amplitude in decibels.

If a true signal is present on any input line D1, D2, D3 or D4 of flag register 330, a corresponding flag signal $F_1$, $F_2$, $F_3$ or $F_4$ is generated on the rising edge of each inverse clock pulse $\overline{C}$. The outputs of flag resistor 330 enable inverters 370, 371 and 372 to provide inverse flag signals $\overline{F}_1$, $\overline{F}_2$ and $\overline{F}_3$.

Figure 17:
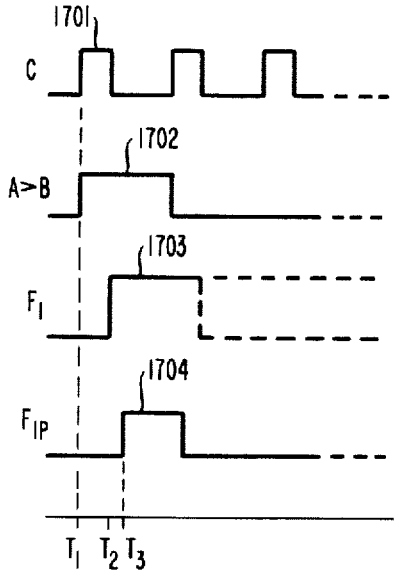
FIG. 17 shows waveforms illustrating the operation of the magnitude of the flag generator of FIG. 3.

As shown in waveform 1703 of FIG. 17, a true flag signal $F_1$ is generated at time $T_2$. Flag signal $F_1$ is also applied to one-shot 360 which supplies flag pulse $F_{1P}$ (waveform 1704) beginning at time $T_3$. The A>B outputs of comparators 311, 312 and 313, and signals $F_2$, $F_3$ and $F_4$ respond to energy level signals $LV_n$ in a manner similar to that illustrated by waveforms 1702 and 1703.

Figure 4:
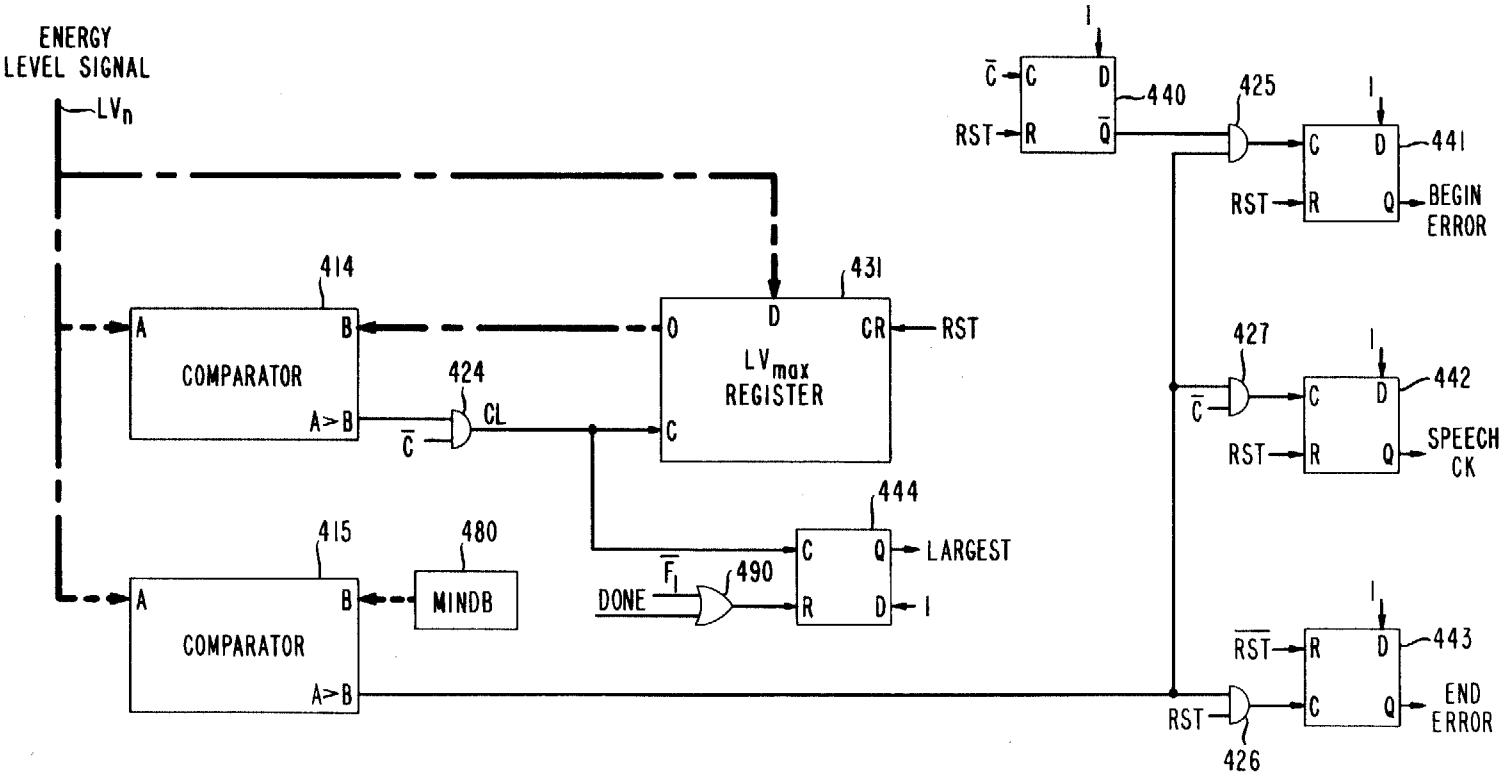
FIG. 4 shows a detailed block diagram of a boundary speech and pulse detector that may be used in the endpoint detector of FIG. 1.
Figure 18:
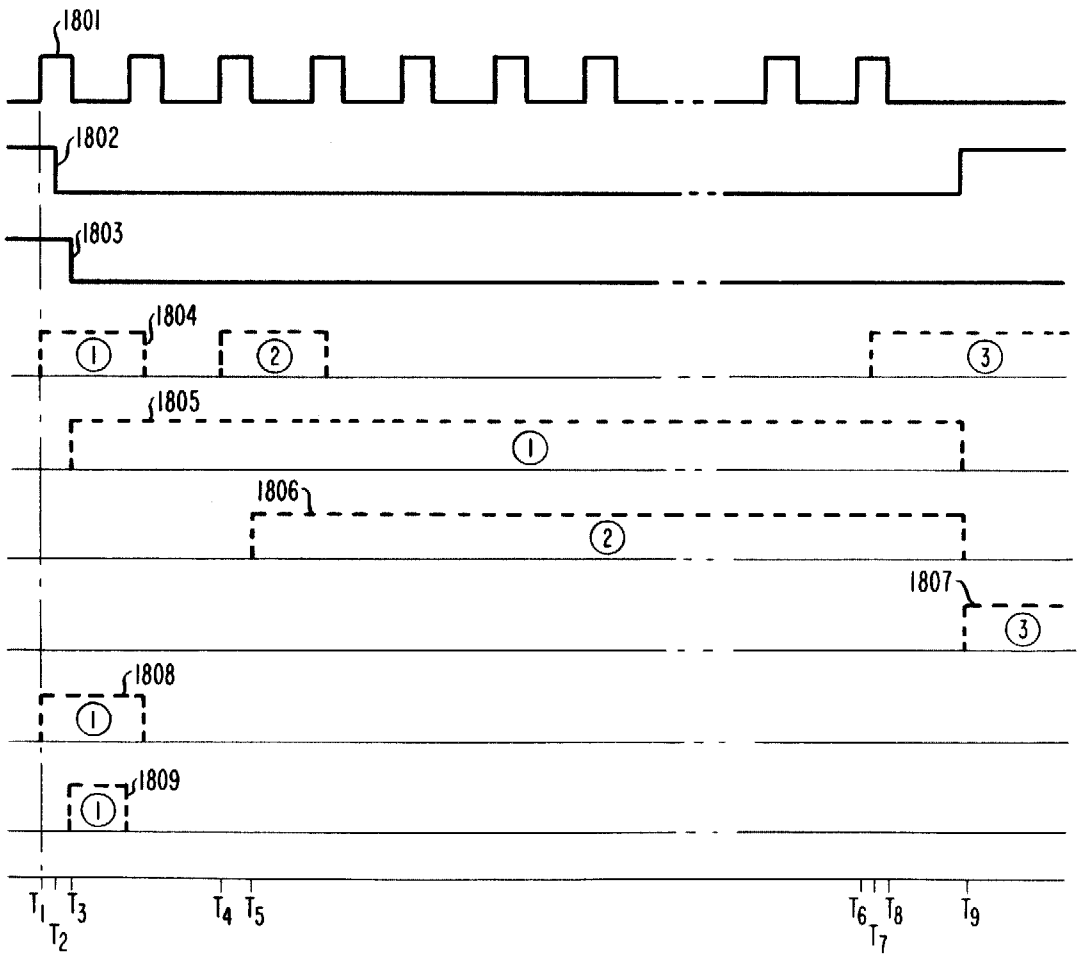
FIG. 18 shows waveforms illustrating the operation of the boundary speech and pulse detector of FIG. 4.
Figure 19:
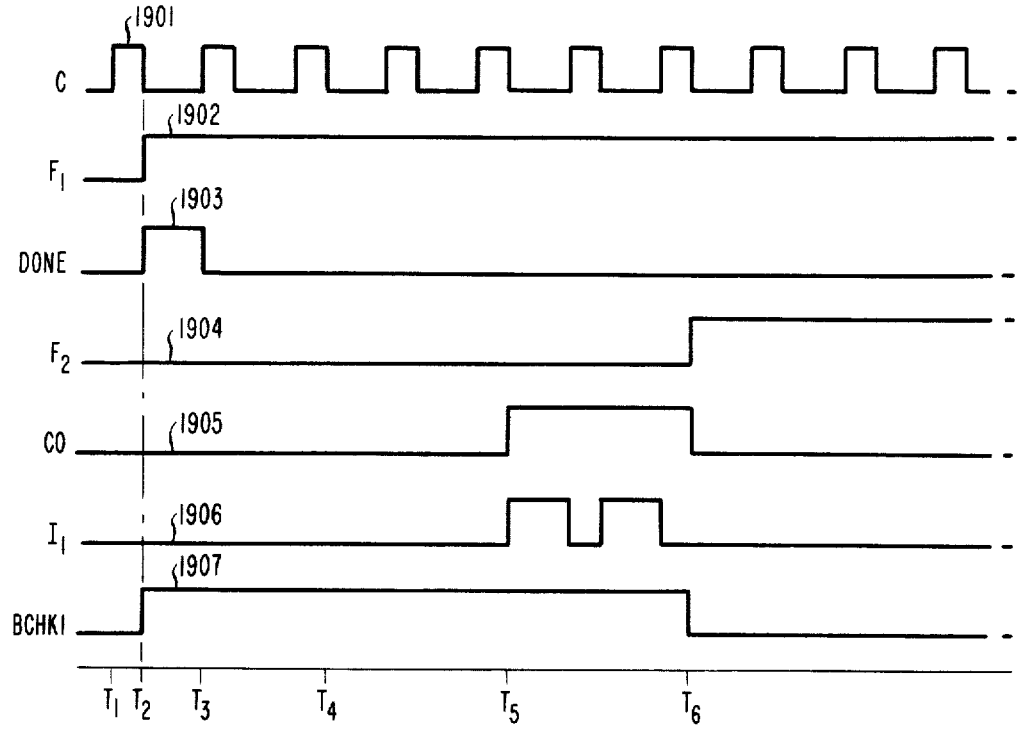
FIG. 19 shows waveforms illustrating the operation of the begin generator of FIG. 5.

Referring to FIG. 4, magnitude comparator 414 is operative to compare the current value of an energy level signal $LV_n$ to a prior value of $LV_n$ stored in $LV_{max}$ register 431. The stored value of signal $LV_n$ is applied from $LV_{max}$ register 431 to the B input of magnitude comparator 414. If the current $LV_n$ signal is greater than the prior value of $LV_n$ stored in $LV_{max}$ register 431, a true signal is generated at the A>B output of comparator 414. The A>B output of comparator 414 is shown as condition 1 at time $T_1$ of waveform 1808 in FIG. 18. (Conditions 1, 2 and 3 in FIG. 18 are, for illustration, mutually exclusive timing waveforms representative of three different input utterances.) The true signal from comparator 414 is applied to AND-gate 424. AND-gate 424 is enabled by inverse clock pulse $\overline{C}$ and provides an output signal $C_L$ (condition 1 at $T_3$ in waveform 1809). Signal $C_L$ is applied to the clock input of register 431. Register 431 thereby stores the energy level signal $LV_n$ applied to its data input D. Signal $C_L$ is also applied to flip-flop 444 which outputs signal LARGEST, indicating that a new value for energy level signal $LV_{max}$ has been stored in $LV_{max}$ register 431. Flip-flop 444 is reset via OR-gate 490 by inverse flag signal $\overline{F}_1$ (i.e. when flag signal $F_1$ becomes false) or by signal DONE from OR-gate 792 in FIG. 7.

If, on the other hand, the current value of energy level signal $LV_n$ is less than the prior stored value, signal $C_L$ is not produced and the prior stored value remains in $LV_{max}$ register 431. Thus, comparator 414 and $LV_{max}$ register 431 are operative to detect and store the maximum energy level signal $LV_{max}$ from the input utterance sequence of energy level signals $LV_n$, n=1,L. $LV_{max}$ register 431 may be, for example, a Texas Instruments type SN74273.

In magnitude comparator 415, energy level signal $LV_n$ is compared to constant signal MINDB. Signal MINDB may, for example, be the output of a binary constant generator 480, as is well known in the art, and may correspond to an amplitude of 30 dB. If energy level signal $LV_n$ is greater than constant signal MINDB, a true signal is sent from the A>B output of magnitude comparator 415 via AND-gate 425 to the C input of flip-flop 441. AND-gate 425 is enabled when the output $\overline{Q}$ (at time $T_1$ in waveform 1803 of FIG. 18) of flip-flop 440 is true. Output $\overline{Q}$ is true during the first clock pulse C (time $T_1$ to $T_3$ of waveform 1801). At time $T_3$, inverse clock pulse $\overline{C}$ is applied to the C input of flip-flop 440 which causes output $\overline{Q}$ to generate a false signal. AND-gate 425 is thereby enabled only for the first frame in the input utterance and is disabled during subsequent frames. Flip-flop 440 and 441 thus provide a check on the first energy level signal $LV_1$. If signal $LV_1$ is greater than constant signal MINDB, it is likely that speech overlaps the beginning boundary of the input utterance. Flip-flop 441 then outputs signal BEGINERROR (condition 1 at time $T_3$ of waveform 1805). Signal BEGINERROR is applied to utilization device 103 in FIG. 1 to indicate that the input utterance is invalid.

Flip-flop 443 provides a similar check for the presence of speech on the ending boundary of the input utterance. Reset signal RST is applied to AND-gate 426 at time $T_9$ (waveform 1802 in FIG. 18). If last energy level signal $LV_L$ is greater than constant signal MINDB, a true signal (condition 3 of waveform 1804) from the A>B output of magnitude comparator 415 is applied via AND-gate 426 to the C input of flip-flop 443. Flip-flop 443 outputs signal ENDERROR (condition 3 of waveform 1807) at time $T_9$ which is applied to utilization device 103 to indicate that the input utterance is invalid.

Flip-flop 442 is set at time $T_4$ via AND-gate 427 by a true signal (condition 2 of waveform 1804 in FIG. 18) from the A>B output of magnitude comparator 415. Thus, if at least one energy level signal $LV_n$ in the interval of frames n=1 to L is greater than constant signal MINDB, signal SPEECHCK (condition 2 at time $T_5$ of waveform 1806 in FIG. 18) is rendered true at the $\overline{Q}$ output of flip-flop 442. If signal SPEECHCK remains false, utilization device 103 is thereby signaled that the input utterance does not contain speech.

Figure 5:
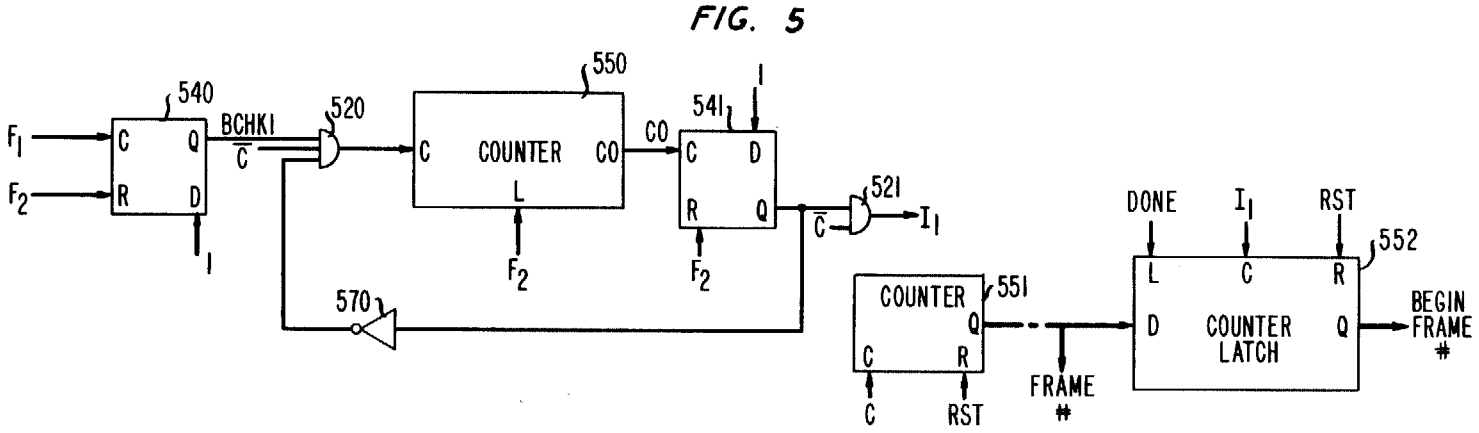
FIG. 5 shows a detailed block diagram of a begin generator that may be used in the endpoint detector of FIG. 1.

Referring to FIG. 5, signal $F_1$ (waveform 1902 in FIG. 19) from flag register 330 is applied to the C input of flip-flop 540 at time $T_2$. The Q output of flip-flop 540 is thus true and resulting signal BCHK1 (waveform 1907) is applied to AND-gate 520 at time $T_2$. AND-gate 520 is enabled by inverse clock pulse $\overline{C}$. The output of AND-gate 520 is applied to the input of counter 550. If counter 550 receives a predetermined number of pulses from AND-gate 520, for example, four pulses, prior to being reset by signal $F_2$ (waveform 1904), true signal CO is generated at the output of the counter. Signal CO (waveform 1905) clocks flip-flop 541 at time $T_5$, causing a true signal at output Q thereof. The true signal from output Q of flip-flip 541 is applied to AND-gate 521. AND-gate 521 is enabled by inverse clock pulse $\overline{C}$ and generates pulse $I_1$. The generation of pulse $I_1$ (beginning at time $T_5$ in waveform 1906) indicates that the time required for energy level signals $LV_n$ to rise from amplitude $K_1$ to $K_2$ is greater than or equal to four frames.

Master counter 551 is reset to zero by reset signal RST. For each clock pulse C (waveform 1901), master counter 551 is incremented by one and provides a coded signal FRAME# corresponding to each frame n=1,L. Signal FRAME# is applied to the data input D of counter latch 552.

Figure 7:
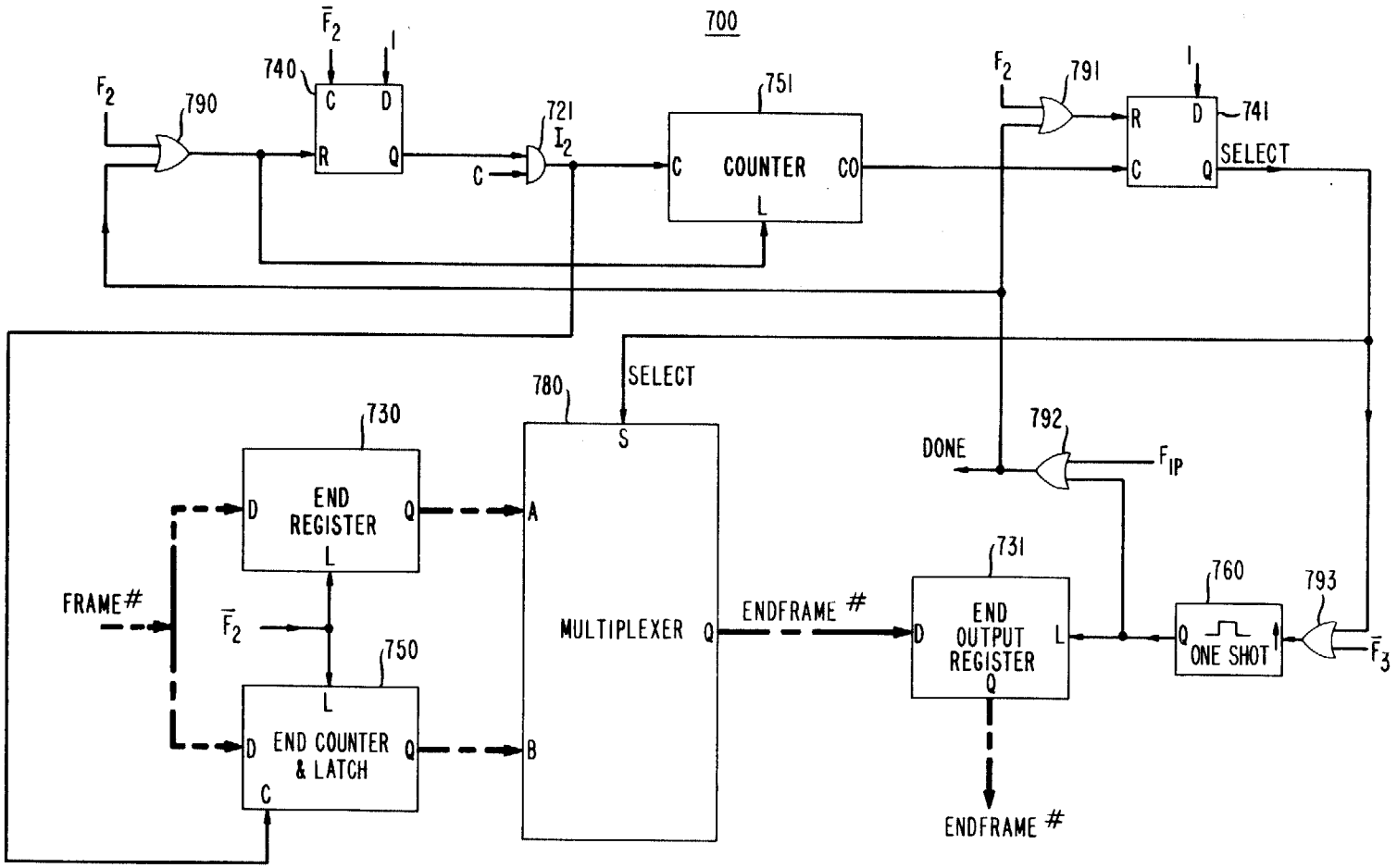
FIG. 7 shows a detailed block diagram of an end generator that may be used in the endpoint detector of FIG. 1.

When an energy level signal $LV_n$ exceeds amplitude K, signal $F_{1P}$ from one-shot 360 is applied to OR-gate 792 in FIG. 7. The DONE signal from OR-gate 792 causes counter latch 552 to receive the current FRAME# signal from counter 551. The FRAME# signal stored in counter latch 552 is designated signal BEGINFRAME#. Responsive to each pulse $I_1$ from AND-gate 521, the BEGINFRAME# signal stored in counter latch 552 is incremented by one. When an energy level signal $LV_n$ exceeds amplitude $K_2$ at time $T_6$ in FIG. 19, signal $F_2$ (waveform 1904) from flag register 330 is applied to the reset terminals of flip-flops 540 and 541, and counter 550. AND-gate 521 is thereby inhibited and pulse $I_1$ is discontinued. The BEGINFRAME# signal in counter latch 552 is thus equal to the current FRAME# signal minus four, that is, four frames preceding the FRAME# signal which occurred when the energy level signal $LV_n$ exceeded constant signal $K_2$. Signal BEGINFRAME# is thereby adjusted when signal $LV_n$ has a long rise time. A long rise time suggests the presence of non-speech sounds, such as breathiness, at the beginning of the input utterance.

If a sequence of energy level signals $LV_n$ has a short rise time, that is, if signal $F_2$ goes true less than four frames after signal $F_1$ goes true, signal $I_1$ and CO remain false. The BEGINFRAME# signal in counter latch 552 is therefore not adjusted and remains equal to the frame in which signal $F_1$ became true. Counters 550 and 551, and counter latch 552 may each be, for example, a Texas Instruments type SN74163.

Figure 6:
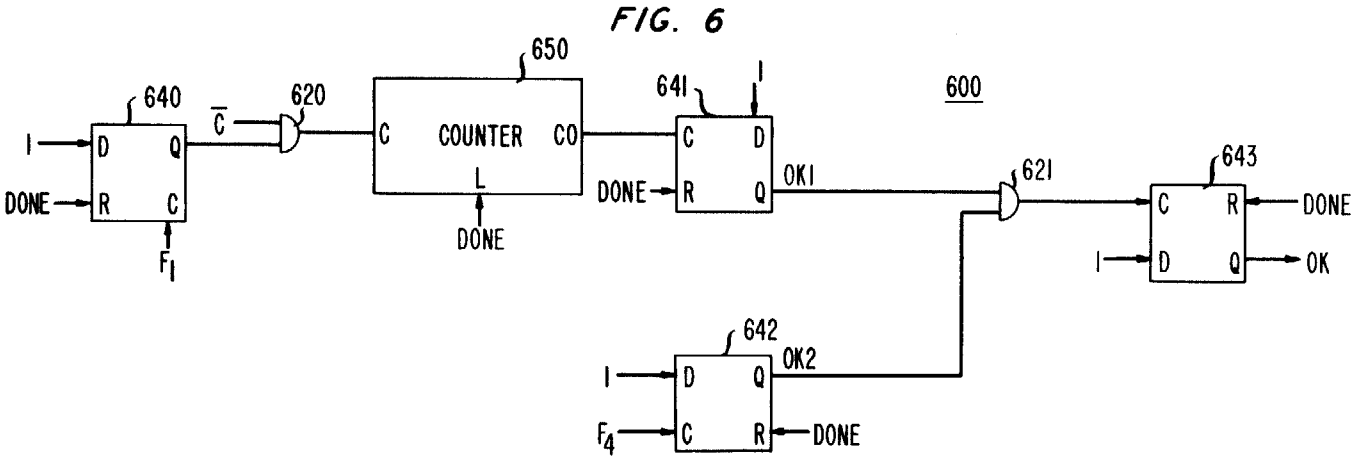
FIG. 6 shows a detailed block diagram of a duration and energy detector that may be used in the endpoint detector of FIG. 1.
Figure 20:
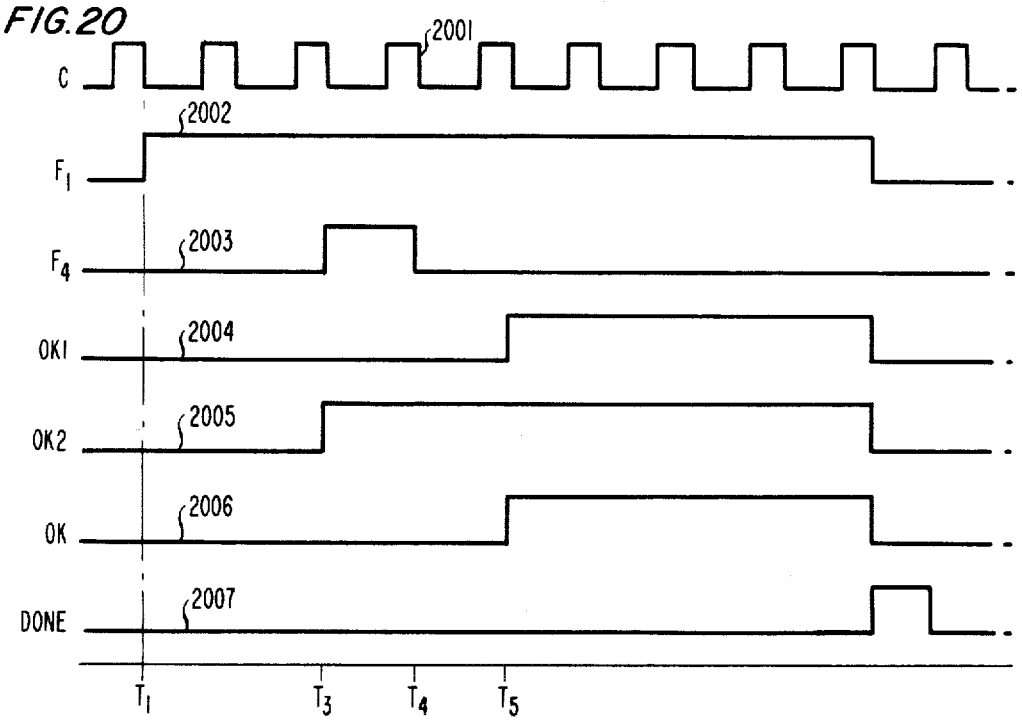
FIG. 20 shows waveforms illustrating the operation of the duration and energy detector of FIG. 6.

Referring to FIG. 6, signal $F_1$ from flag register 330 is applied to the C input of flip-flop 640 (beginning at time $T_1$ in waveform 2002 of FIG. 20). The Q output of flip-flop 640 generates a true signal which is applied to AND-gate 620. AND-gate 620 is enabled by the next inverse clock pulse $\overline{C}$ and applies a pulse which increments counter 650. If counter 650 increments to a predetermined number, for example four, before being reset by signal DONE from OR-gate 792 in FIG. 7, a true signal is generated at the output of the counter. The true signal clocks flip-flop 641. The Q output of flip-flop 641 generates signal OK1 (at time $T_5$ in waveform 2004 of FIG. 20), indicating that the energy signal pulse at least equals the predetermined minimum duration of four frames. If signal $F_1$ is true for less than four frames, signal OK1 remains false.

Flag signal $F_4$ (waveform 2003) from flag register 330 is applied to the C input of flip-flop 642 at time $T_3$. The Q output of flip-flop 642, signal OK2 (at time $T_3$ of waveform 2005) is applied to AND-gate 621. AND-gate 621 is enabled by signal OK1 from flip-flop 641 at time $T_5$. The output of AND-gate 621 in turn clocks flip-flop 643. Thus, (1) if the sequence of energy level signals has a minimum duration of at least four frames and (2) at least one energy level signal $LV_n$ within the sequence is greater than or equal to constant signal $K_4$ (15 dB), flip-flop 643 outputs signal OK (waveform 2006) at time $T_5$. If, on the other hand, either signal OK1 or OK2 is false, signal OK remains false and the energy level signal sequence is considered to be an artifact.

Figure 21:
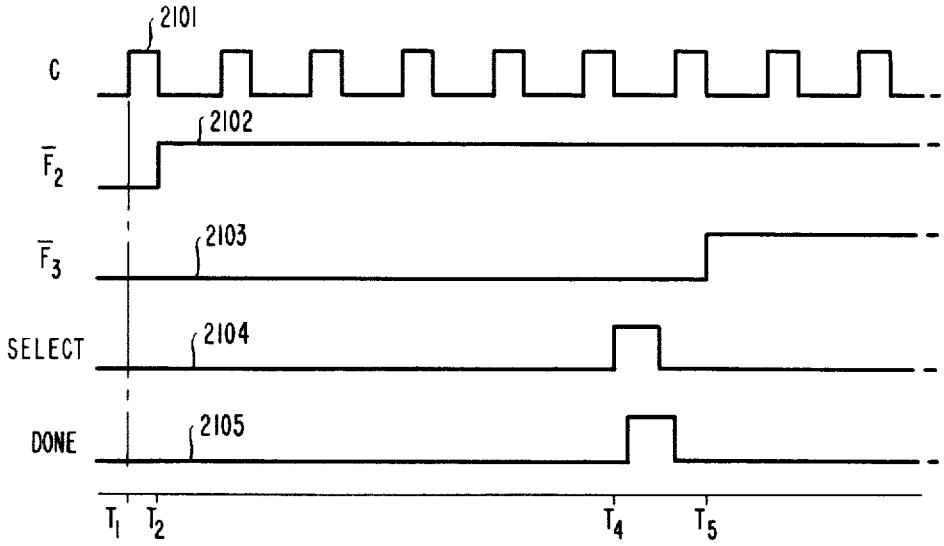
FIG. 21 shows waveforms illustrating the operation of the end generator of FIG. 7.

Referring to end generator 700 in FIG. 7, when an energy level signal $LV_n$ drops below amplitude $K_2$, for example, at time $T_2$ in FIG. 21, flag signal $F_2$ is false and inverse flag signal $\overline{F}_2$ (waveform 2102) from inverter 371 is true. The current FRAME# signal from counter 551 is thereby latched into end register 730 and end counter and latch 750. End register 730 may be, for example, a Texas Instruments type SN74174.

Inverse flag signal $\overline{F}_2$ is also applied to the clock input C of flip-flop 740. A true signal is thus applied from the Q output of flip-flop 740 to AND-gate 721. AND-gate 721 is enabled by clock pulse C (waveform 2101). The output of AND-gate 721, pulse $I_2$, increments counter 751 and end counter and latch 750. Thus, for each pulse $I_2$, the FRAME# signal stored in end counter and latch 750 is incremented by one. If counter 751 increments to a predetermined number, for example five, while $\overline{F}_3$ (waveform 2103) remains false, a true signal is generated at the overflow output CO of the counter. The true signal from counter 751 is applied to input C of flip-flop 741. The Q terminal of flip-flop 74 outputs a true signal, called SELECT, at time $T_4$ in FIG. 21. The SELECT signal (waveform 2104) is applied to OR-gate 793 and multiplexer 780. Multiplexer 780 may be, for example, a Texas Instruments type SN74157. The output of OR-gate 793 is applied to one-shot 760. The output of one-shot 760 resets flip-flop 740 and counter 751 via OR-gates 790 and 792.

When the SELECT signal is true, multiplexer 780 accepts data at its A input from end register 730. The output of multiplexer 780 is signal ENDFRAME# which is equal to the value of the FRAME# signal in end register 730. In other words, if an energy level signal $LV_n$ drops below amplitude $K_2$ for five or more frames before dropping below $K_3$, the ending point of the energy signal pulse, signal ENDFRAME#, is equal to the FRAME# signal at which energy level signal $LV_n$ dropped below amplitude $K_2$.

If inverse flag signal $\overline{F}_3$ from inverter 372 becomes true (that is, if energy level signal $LV_n$ drops below amplitude $K_3$) before counter 751 reaches five, the output of OR-gate 793 is applied to one-shot 760. The output of one-shot 760 resets flip-flop 740 and counter 751 via OR-gates 790 and 792. Thus, the SELECT signal remains false and multiplexer 780 accepts data at its B input from end counter and latch 750. Signal ENDFRAME# is therefore equal to the FRAME# signal at which energy level signal $LV_n$ dropped below $K_3$, that is, the frame at which signal $\overline{F}_3$ became true.

Similarly, if flag signal $F_2$ becomes true (that is, if energy level signal $LV_n$ exceeds amplitude $K_2$) before counter 751 reaches five, the output of OR-gate 790 causes flip-flop 740 and counter 751 to reset. Thus, no ENDFRAME# signal is generated.

Responsive to either the SELECT signal or inverse flag signal $\overline{F}_3$, the output of OR-gate 792 is applied to one-shot 760. The output of one-shot 760 is applied to the load input of end output register 731, causing signal ENDFRAME# from multiplexer 780 to be loaded into the register. The output of one-shot 760 is also applied to OR-gate 792. OR-gate 792 thereby outputs the signal DONE.

Signal DONE is generated to reset flip-flops 444, 641, 642, 643, 740 and 741, and counters 552, 650, and 751 in preparation for a new energy signal pulse. In particular, signal DONE causes counter latch 552 in FIG. 5 to store the FRAME# signal which occurred when signal $LV_n$ dropped below amplitude $K_3$, that is, the ENDFRAME# signal which corresponds to the prior energy signal pulse. If the succeeding energy level signals $LV_n$ do not drop below amplitude $K_1$ before exceeding amplitude $K_2$, the BEGINFRAME# signal (from counter latch 552) of the new energy signal pulse is equal to the ENDFRAME# signal of the prior energy signal pulse. If, on the other hand, any of the succeeding energy level signals $IV_n$ drop below amplitude $K_1$ before exceeding amplitude $K_2$, the BEGINFRAME# signal of the new energy signal pulse is set to the frame at which amplitude $K_1$ is subsequently exceeded. Thus, when signal $F_1$ from flag register 330 goes high, one-shot 360 outputs pulse $F_{1P}$. Pulse $F_{1P}$ is applied via OR-gate 792 to again generate signal DONE. Signal DONE is applied to counter latch 552 which latches the FRAME# signal at which an energy level signal $LV_n$ exceeded amplitude $K_1$. The BEGINFRAME# signal which corresponds to the new energy signal pulse is thus equal to the FRAME# signal stored in counter latch 552.

The apparatus shown in FIGS. 2 through 7 outputs BEGINFRAME# and ENDFRAME# signals defining an energy signal pulse for each sequence of energy level signals $LV_n$ in the input utterance in which (1) any of the constituent energy level signals $LV_n$ exceeds constant signal $K_4$ and (2) the energy level signal sequence at least equals the predetermined minimum duration.

Typically, an input utterance comprises a plurality of energy signal pulses. Selected energy signal pulses are combined in order to develop a plurality of endpoint candidate signals, as described below with reference to FIGS. 8 through 15. Major functions of smoother control 800 in FIG. 8 are (1) to provide storage for the endpoint signals corresponding to the energy signal pulses generated in the circuits of FIGS. 1 through 7, (2) to supervise the sequential operation of the state control circuits of FIGS. 10 through 14, (3) to provide the endpoint signals selected in the state control circuits of FIGS. 10 through 14 to smoother processor 900 in FIG. 9, and (4) to supply fault interrupts outside the endpoint detector 150, that is, to utilization device 103.

Referring to FIG. 8, AND-gate 820 in smoother control 800 is enabled by signal DONE from OR-gate 792 in FIG. 7 and signal OK from flip-flop 643 in FIG. 6 for each energy signal pulse.The output of AND-gate 820 in increments address counter 850 and enables the write input W of RAM 830. RAM 830 may comprise, for example, Fairchild 3539 and Intl 2115 memory components. The data output D of address counter 850 is enabled by signal $\overline{RST}$ from one-shot 260. As noted with respect to waveform 1602 in FIG. 16, signal $\overline{RST}$ remains true until after the end of the recording interval. Address counter 850 outputs signal SADDRESS which is, for example, a 4-bit binary coded signal, to bi-directional data bus 801.

The address input A of RAM 830 receives the SADDRESS signal from data bus 801. AND-gate 820 also enables the write input W of RAM 830. Signals BEGINFRAME# from counter latch 552, ENDFRAME# from register 731 and LARGEST from flip-flop 444 are thereby loaded into the memory location in RAM 830 specified by the SADDRESS from address counter 850. Each successive energy signal pulse similarly causes the output of AND-gate 820 to increment address counter 850. Thus, the BEGINFRAME# and ENDFRAME# signals, that is, the endpoints, for each energy signal pulse in an input utterance are stored in successive memory locations in RAM 830.

If address counter 850 is incremented to, for example, fifteen or more, its overflow output O generates fault signal PULSE#ERROR. The PULSE#ERROR signal indicates to utilization device 103 that the input utterance is invalid because too many energy signal pulses are present.

Figure 22:
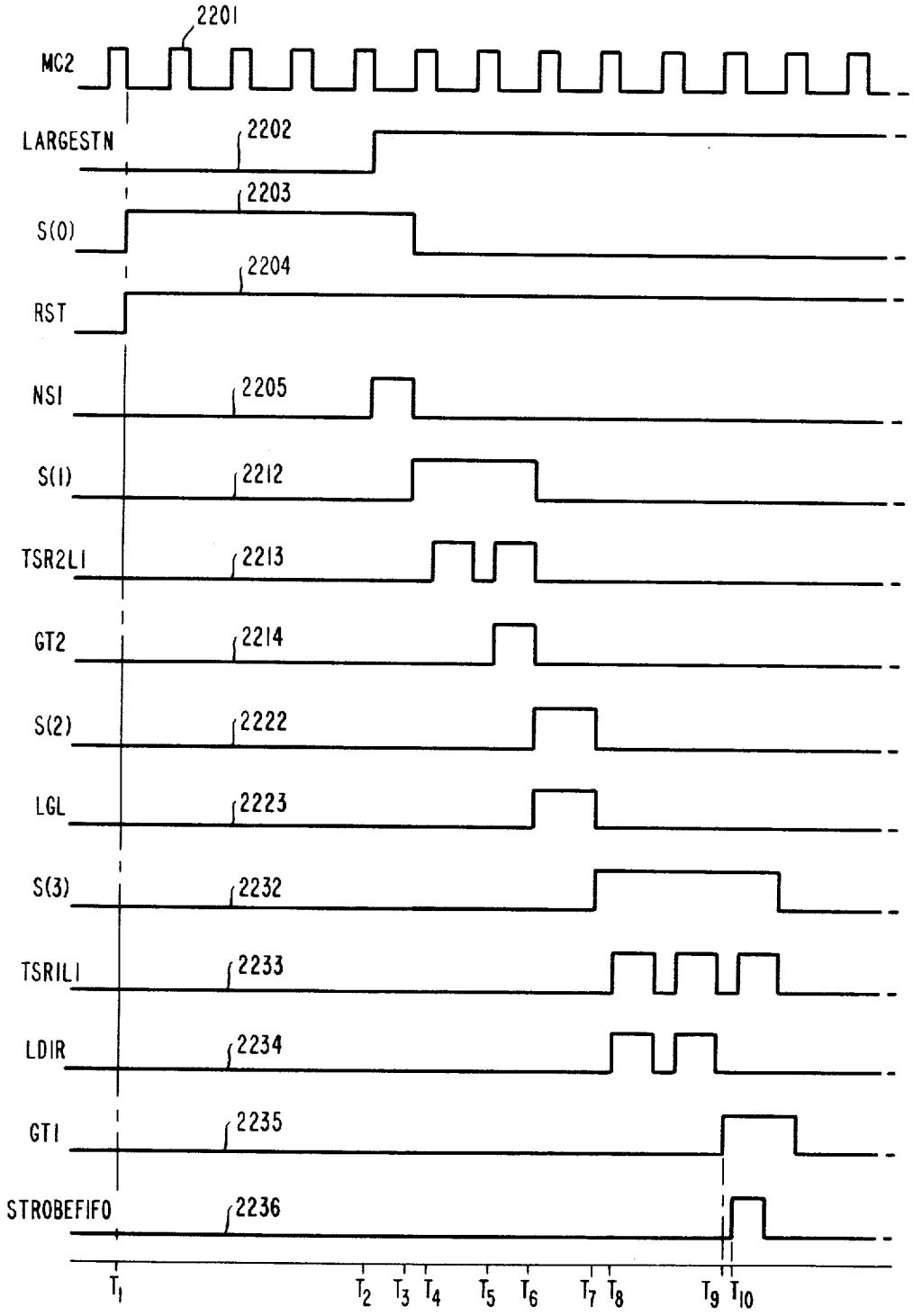
FIG. 22 shows waveforms illustrating the operation of the smoother and state apparatus of FIGS. 8, 9, 10 and 11 and the candidate store of FIG. 15.
Figure 23:
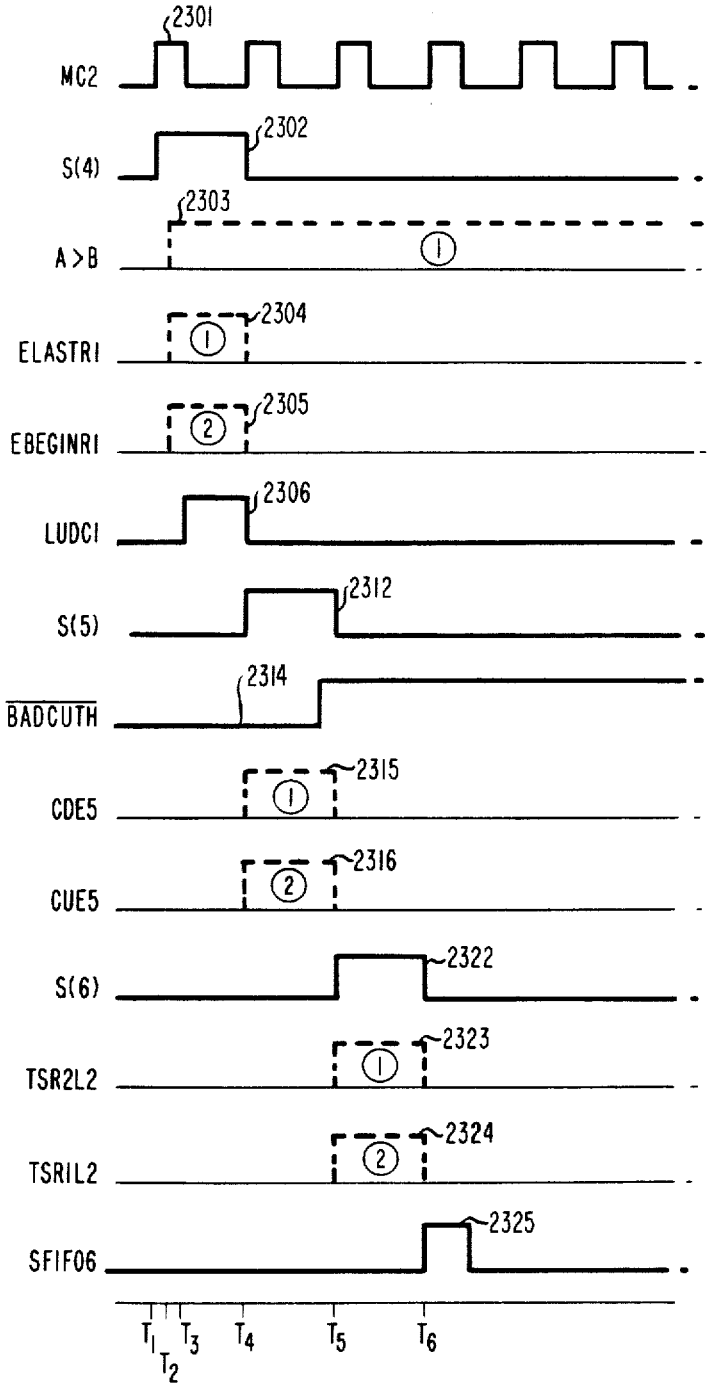
FIG. 23 shows waveforms illustrating the operation of the smoother and state apparatus of FIGS. 8, 9, 11 and 12 and the candidate store of FIG. 15.

At the end of the input utterance, unit 201 in FIG. 2 discontinues clock pulse C which causes one-shot 260 to output a true reset signal RST (at time $T_1$ of waveform 2204 in FIG. 22). Signal RST is used in general to activate the circuits of FIGS. 8 through 5.

In particular, reset signal RST is applied to enable master clock 802. Master clock 802 provides for the synchronous operation of the FIGS. 8 through 15 circuits. (Clock pulse C from unit 201 is applied for the operation of the FIGS. 3 through 7 circuits). Master clock 802 outputs a 1 MHz, for example, clock pulse MC2 (waveform 2201) and inverse clock pulse $\overline{MC2}$.

Reset signal RST is also applied to the clock terminal of end register 831. End register 831 therefore stores the curret value of the SADDRESS signal from address counter 850 on the rising edge of signal RST (at time $T_1$ of waveform 2204 in FIG. 22). The current SADDRESS signal is equal to one plus the SADDRESS signal corresponding to the last energy signal pulse in the input utterance. Since signal RST remains high at the clock terminal C of register 831 during the operation of the circuits shown in FIGS. 8 through 15, data input D of register 831 does not respond to subsequent SADDRESS signals.

Reset signal RST is further applied via one-shot 860 and OR-gate 893 to enable up/down counter 851 to store the current value of the SADDRESS signal. Up/down counter 851 may be, for example, a Texas Instruments type 74S169 circuit.

After the preceding enabling operations, which occur when signal RST goes high, smoother control 800 is ready to initiate the functions performed in smoother processor 900 and the state control circuits FIGS. 10 through 14.

The purpose of the circuits shown in FIGS. 8 through 14 is to generate a plurality endpoint candidate signals from the energy signal pulses formed in the circuitry of FIGS. 1 through 7. The endpoint candidate signals comprise specific combinations of the energy signal pulses, as described below.

The first endpoint candidate signal is formed by combining energy signal pulses separated from each other by less than a predetermined number of frames together with the largest energy signal pulse. These combined energy signal pulses, including the largest energy signal pulse, are called the smoothed energy signal pulse. The endpoint signals of the smoothed energy signal pulse comprise the beginning frame of the first energy signal pulse constituent of the smoothed energy signal pulse, and the ending frame of the last energy signal pulse constituent of the smoothed energy signal pulse.

The second endpoint candidate signal is formed by removing either the first or last energy signal pulse constituent of the smoothed energy signal pulse. The energy signal pulse of shortest duration is removed. If the first and last energy signal pulses are of equal duration, the first pulse is removed. The remainder of the smoothed energy signal pulse is called the truncated energy signal pulse. The endpoints of the truncated energy signal pulse define the second endpoint candidate signal.

The third endpoint candidate signal is formed by combining the smoothed energy signal pulse with the next following energy signal pulse if said following energy signal pulse begins within a prescribed number of frames of the end of the smoothed energy signal pulse. The beginning frame of the smoothed energy signal pulse and the ending frame of the following energy signal pulse thus define the endpoint signals which comprise the third endpoint candidate signal.

The fourth endpoint candidate signal is formed by combining the smoothed energy signal pulse with the immediately preceding energy signal pulse if said preceding energy signal pulse ends within a prescribed number of frames of the beginning of the smoothed energy signal pulse. The beginning frame of the preceding energy signal pulse and the ending frame of the smoothed energy signal pulse thus define the endpoint signals which comprise the fourth endpoint candidate signal.

There are eighteen states corresponding to the eighteen logic circuits of FIGS. 10 through 14. Each state represents a particular logical function to be performed sequentially in smoother processor 900 in order to combine energy signal pulses to form endpoint candidate signals.

Table I contains a reference summary of the functions performed in each state, zero to seventeen. The states are described in detail following Table I.

TABLE I

| STATE | FUNCTION SUMMARY |
|---|---|
| S(0) | Find the SADDRESS signal for the largest energy signal pulse, latch it into largest address register 836, and store the corresponding BEGINFRAME#N and ENDFRAME#N signals in registers 931 and 932. |
| S(1) | Find the SADDRESS signal for the last of the energy signal pulses which are separated from each other by less than the constant NSEP and which follow the largest energy signal pulse, store said SADDRESS signal in register 832, store the length if said last energy signal pulse in register 933, and store the corresponding ENDFRAME#N signal from RAM 830 in register 932. |
| S(2) | Load the SADDRESS signal for the largest energy signal pulse into up/down counter 851. |
| S(3) | Find the SADDRESS signal for the first of the energy signal pulses which are separated from each other by less than the constant NSEP and which precede the largest energy signal pulse, store said SADDRESS signal in register 833, store the length of said first energy signal pulse in register 930, and store the corresponding BEGINFRAME#N signal from RAM 830 in register 931. Load the OUTBEGIN signal from register 931 and the OUTEND signal from register 932, which signals comprise the endpoints of the smoothed energy signal pulse, into the number one candidate location of candidate store 1500. |
| S(4) | Compare the lengths of the last energy signal pulse from state one and the first energy signal pulse from state three in comparator 910. Store the SADDRESS of the energy signal pulse of shorter duration in up/down counter 851. |
| S(5) | Change the SADDRESS signal in up/down counter 851 to the SADDRESS of the energy signal pulse within the smoothed energy signal pulse that is adjacent to said shorter energy signal pulse from state four. |
| S(6) | Load the endpoint signals of the energy signal pulse which comprises the smoothed energy signal pulse less said shorter energy signal pulse into the number two endpoint candidate location of candidate store 1500. |
| S(7) | Load the SADDRESS of the energy signal pulse removed in state four into RAM 830 and up/down counter 851. |
| S(8) | Load the endpoint signals of the smoothed energy signal pulse into registers 931 and 932. |
| S(9) | Load the SADDRESS signal for the last energy signal pulse within the smoothed energy signal pulse into up/down counter 851. |
| S(10) | Increment the up/down counter 851 to the SADDRESS signal for the energy signal pulse succeeding the smoothed energy signal pulse (if a succeeding pulse exists). |
| S(11) | If the succeeding energy signal pulse is within the constant MAXFRAMES of the smoothed energy signal pulse, store OUTBEGIN and OUTEND signals from registers 931 and 932, which signals comprise the beginning frame of the smoothed energy signal pulse and the ending frame of the succeeding energy signal pulse, in the third endpoint candidate location of candidate store 1500. |
| S(12) | Load the SADDRESS signal for the last energy signal pulse within the smoothed energy signal pulse from register 832 into the up/down counter 851. |
| S(13) | Load register 932 with the ENDFRAME#N signal of the smoothed energy signal pulse from RAM 830, as determined by the SADDRESS signal from state twelve. |
| S(14) | Load the SADDRESS signal for the first energy signal pulse within the smoothed energy signal pulse into up/down counter 851. |
| S(15) | Decrement the up/down counter 851 to the SADDRESS signal for the energy signal pulse preceding the smoothed energy signal pulse (if a preceding pulse exists). |
| S(16) | If the preceding energy signal pulse is within the constant MAXFRAMES of the smoothed energy signal pulse, store OUTBEGIN and OUTEND signals from registers 931 and 932, which signals comprise the beginning frame of the preceding energy signal pulse and the ending frame of the smoothed energy signal pulse, in the fourth endpoint candidate location of candidate store 1500. |
| S(17) | Generate signal ALLDONEL to indicate that all endpoint candidates have been formed. |

In order to initiate the first state, called state zero, state counter 852 in FIG. 8 outputs a 4-bit code, for example, to demultiplexer 880. Demultiplexer 880 thereby generates a true signal, called state zero signal S(0), at time $T_1$ in waveform 2203 of FIG. 22. State counter 852 may be, for example, a Texas Instruments type 74163 circuit. Demultiplexer 880 may comprise, for example, a cascade of Texas Instruments type 74154 circuits.

Figure 10:
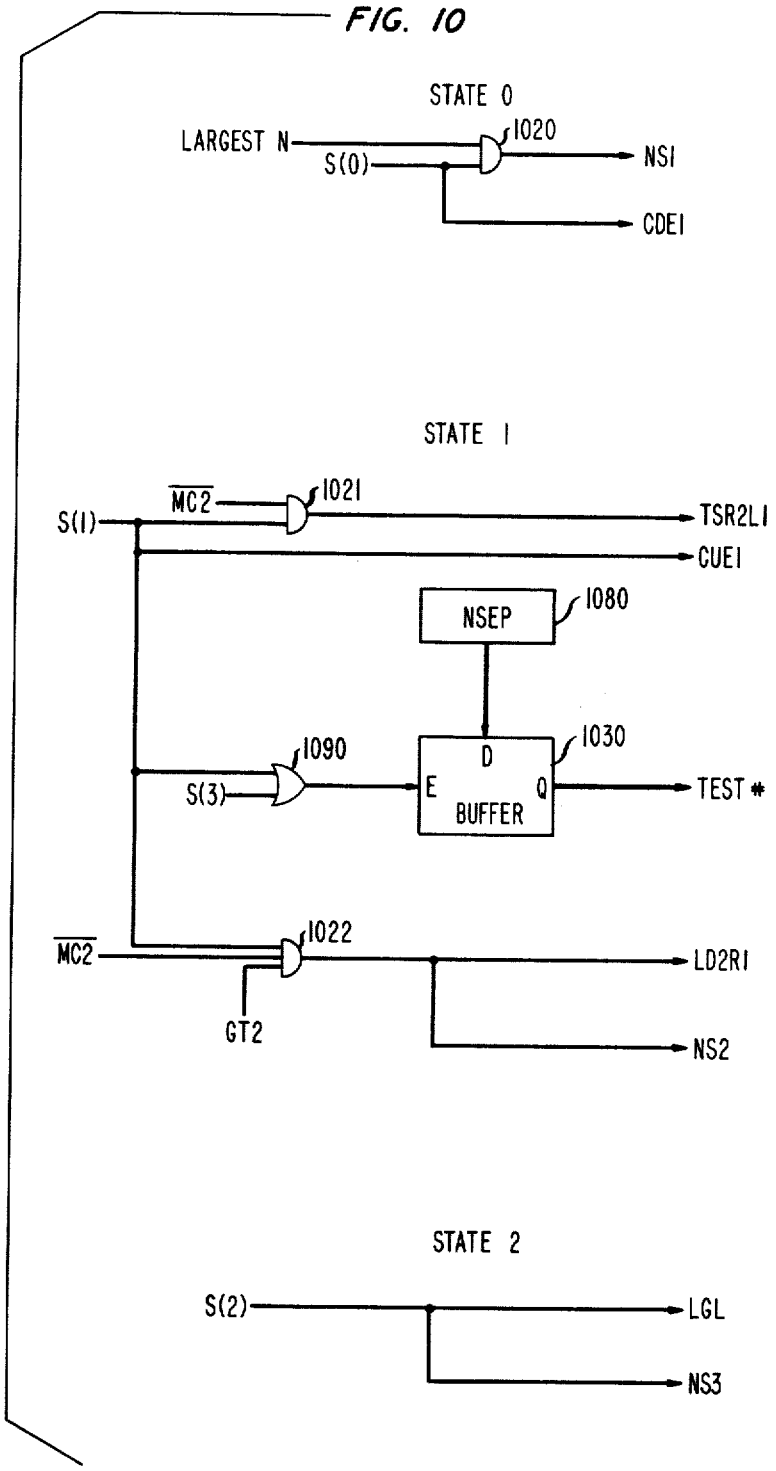

Referring to FIG. 10, state zero signal S(0) is also called count down enable signal CDE1. CDE1 is applied to OR-gate 895, in FIG. 8. The output of OR-gate 895 enables AND-gate 822 which outputs count down signal CTD on the rising edge of inverse clock pulse MC2. Signal CTD causes the SADDRESS signal stored in up/down counter 851 to be decremented. This decremented SADDRESS signal is applied via buffer 834 and data bus 801 to input A of RAM 830. Ram 830 outputs the BEGINFRAME #N, ENDFRAME#N and LARGESTN signal corresponding to the memory location specified by signal SADDRESS. The SADDRESS signal will continue to be decremented by up/-down counter 851 until the LARGESTN signal (time $T_2$ in waveform 2202 of FIG. 22) is true. When signal LARGESTN becomes true at time $T_2$, AND-gate 1020 in FIG. 10 is enabled and outputs next state signal NS1.

Figure 9:
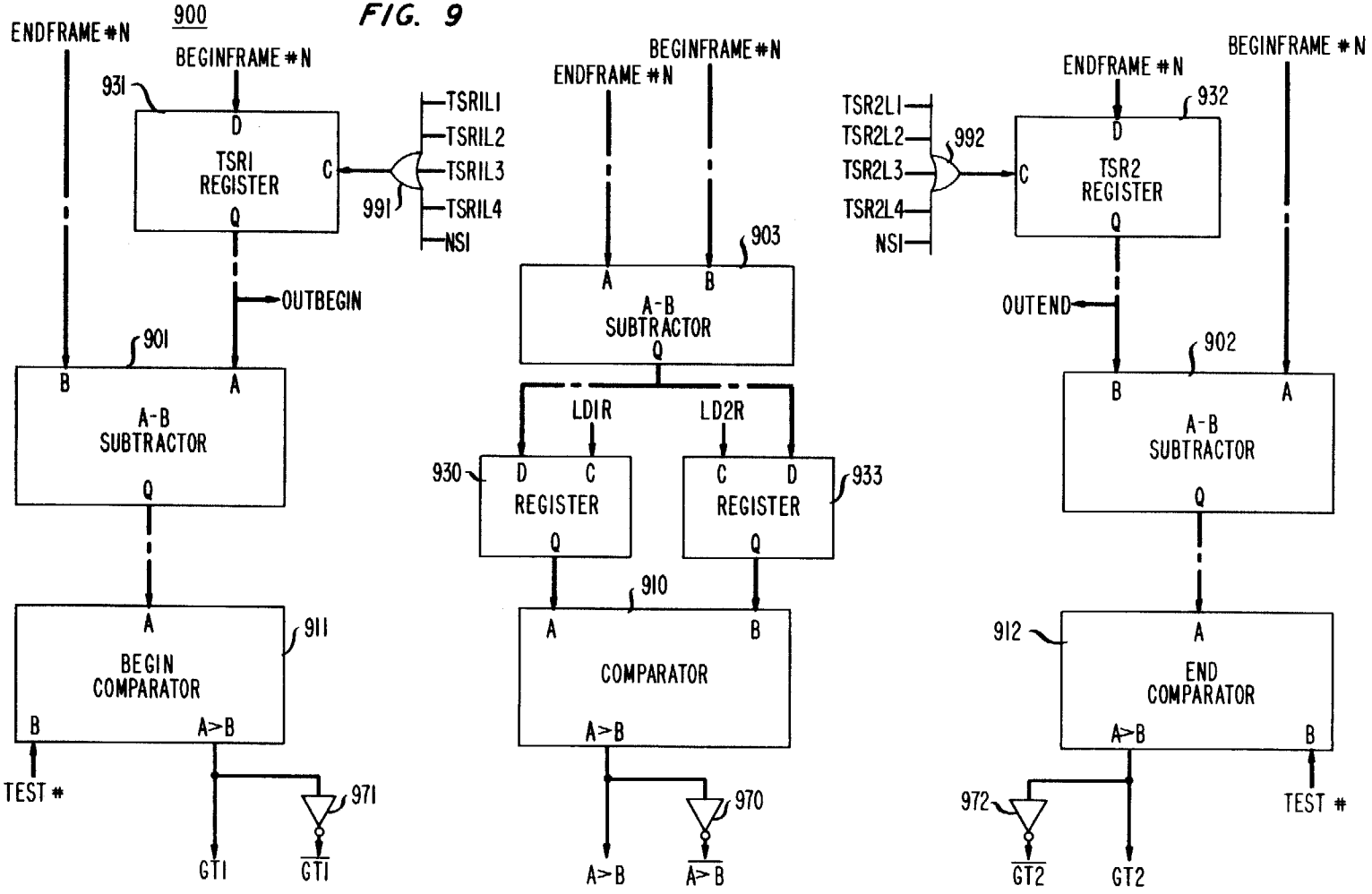
FIG. 9 shows a detailed block diagram of a smoother processor that may be used in the endpoint detector of FIG. 1.

Referring to FIG. 9, signal NS1 (time $T_2$ in waveform 2205) is applied to OR-gates 991 and 992, enabling registers 931 and 932 to store the BEGINFRAME#N and ENDFRAME#N, signals from RAM 830, respectively. Registers 931 and 932 thus contain the endpoint signals corresponding to the largest energy signal pulse. In FIG. 8 signal NS1 is applied to input C of the largest address register 836 which thereby stores the SADDRESS signal of the largest energy signal pulse.

Signal NS1 is also applied to OR-gate 890, thereby enabling AND-gate 823 at the next clock pulse MC2 from clock 802. AND-gate 823 produces a pulse which increments state counter 852 by one. The state of demultiplexer 880 is thereby modified and a state one signal S(1) (waveform 2212) is obtained at time $T_3$.

In FIG. 10 state one signal S(1) is also called count up enable signal CUE1. CUE1 is applied to OR-gate 894 in FIG. 8. The output of OR-gate 894 enables AND-gate 821 which in turn outputs count up signal CTU on the rising edge of inverse clock pulse $\overline{MC2}$. Signal CTU causes the SADDRESS signal in up/down counter 851 to increment. The incremented SADDRESS signal is then applied via buffer 834 and data bus 801 to input A of RAM 830. Since the prior SADDRESS specified the memory location containing the endpoint signals corresponding to the largest energy signal pulse, the current SADDRESS signal specifies the memory location containing the endpoint signals of the succeeding energy signal pulse. RAM 830 thus outputs the endpoint signals BEGINFRAME#N and ENDFRAME#N of the succeeding energy signal pulse.

State one signal S(1) also enables AND-gate 1021 which outputs signal TSR2L1 (at time $T_4$ in waveform 2213 of FIG. 22) on the leading edge of the next occurring inverse clock signal $\overline{MC2}$. Signal TSR2L1 is applied to OR-gate 992 which clocks the current ENDFRAME#N signal into register 932 and clocks the prior ENDFRAME#N signal out of register 932. The prior ENDFRAME#N signal from register 932 is applied to the subtrahend input of subtractor 902. The minuend input of subtractor 902 receives the current BEGINFRAME#N signal from RAM 830. Subtractor 902 may comprise, for example, a Texas Instruments true 74S381/74S182 circuit.

State one signal S(1) further enables OR-gate 1090 which causes the buffer 1030 to output signal TEST# Signal TEST # is equal to constant signal NSEP. NSEP may, for example, be equal to six. NSEP may be supplied to data input D of buffer 1030 with a binary switch and constant voltage source 1080, as is well known in the art.

Signal TEST# is applied to the B input of comparator 912 and the difference signal from the Q output of subtractor 902 is applied to the A input of the comparator. If the difference between the prior ENDFRAME#N signal (corresponding to the ending frame of the largest energy signal pulse) and the current BEGINFRAME#N signal (the beginning frame of the succeeding energy signal pulse) is less than or equal to constant signal NSEP=6 frames, the A>B output of comparator 912, signal GT2 (waveform 2214), is false. If signal GT2 is false, the largest energy signal pulse and the next succeeding energy signal pulse are combined together into a single smoothed energy signal pulse. The smoothed energy signal pulse endpoints comprise the prior BEGINFRAME#N and the current ENDFRAME#N, that is, the beginning frame of largest energy signal pulse and the ending frame of the succeeding pulse. On the next inverse clock signal $\overline{MC2}$, up/down counter 851 increments to the SADDRESS signal corresponding to the next succeeding energy signal pulse and the comparison process is repeated. Succeeding energy signal pulses will thus be combined into the smoothed energy pulse until signal GT2 (waveform 2214) from comparator 912 true at time $T_5$, that is, until an energy signal pulse is separated by more than constant signal NSEP frames from a preceding energy signal pulse.

When GT2 goes true at time $T_5$ in FIG. 22, AND-gate 1022 outputs signal LD2R1. Signal LD2R1 is applied to OR-gate 891. OR-gate 891 outputs signal LD2R which causes register 933 to store the output of subtractor 903. The output of subtractor 903 is the difference between each BEGINFRAME#N signal and ENDFRAME#N signal supplied by RAM 803. The output of subtractor 903 is thus the length of the last energy signal pulse which was combined into the smoothed energy signal pulse. Signal LD2R1 is also applied via OR-gate 891 to input C of register 832 which stores the SADDRESS signal corresponding to the last energy signal pulse within the smoothed energy signal pulse.

AND-gate 1022 also outputs signal NS2. Signal NS2 is applied via OR-gate 890 and AND-gate 823 to increment state counter 852 on the next occurring clock signal MC2. State counter 852 thereby causes demultiplexer 880 to output state two signal S(2) (waveform 2222 in FIG. 22) at time $T_6$.

In FIG. 10, signal S(2) is also called signal LGL. Signal LGL is applied (at time $T_6$ of waveform 2223 in FIG. 22) to AND-gate 827 in FIG. 8. AND-gate 827 is enabled by reset signal RST and the output of NOR-gate 896. Since signals EBEGINR and ELASTR, from OR-gates 1390 and 1391, and signal RST, from one-shot 260, [the] *are* true at time $T_6$ in FIG. 22, [are] *the* output of NOR-gate 896 is true.

AND-gate 827 outputs signal LGL1. Signal LGL1 enables buffer 835 to apply the SADDRESS signal corresponding to the largest energy signal pulse to data bus 801. Signal LGL1 is also applied to NOR-gate 897, thereby inhibiting AND-gate 826 and the output of buffer 834.

Signal S(2) is further applied to AND-gate 825 which is enabled on the next occurring inverse clock signal $\overline{MC2}$. The output of AND-gate 835 is applied via OR-gate 893 to load up/down counter 851 with signal SADDRESS from the data bus 801, that is, the address corresponding to the largest energy signal pulse.

Signal S(2) is also called signal NS3, in FIG. 10. Signal NS3 is applied via OR-gate 890 and AND-gate 823 to increment state counter 852. The state of demultiplexer 880 is thereby modified and a state three signal S(3) (waveform 2232) is obtained at time $T_7$.

Figure 11:
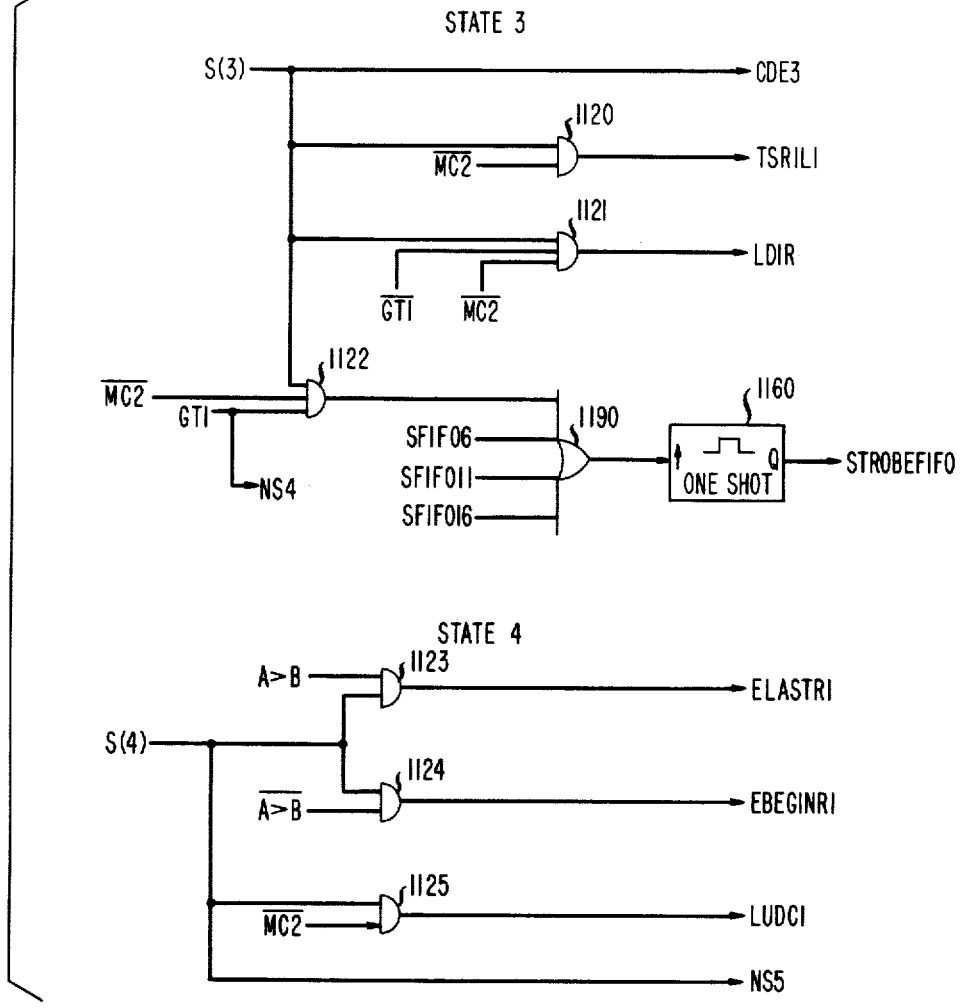

Referring to FIG. 11, S(3) is also called signal CDE3. Signal CDE3 is applied to OR-gate 895 which causes AND-gate 822 to output signal CTD of the rising edge of inverse clock signal $\overline{MC2}$. Signal CTD decrements the SADDRESS signal in up/down counter 851. Up/-down counter 851 thus outputs the SADDRESS signal corresponding to the energy signal pulse prior to the largest energy signal pulse. This SADDRESS signal is applied to buffer 834 and data bus 801. Responsive to signal SADDRESS, RAM 830 outputs the corresponding endpoint signals BEGINFRAME#N and ENDFRAME#N.

Signal S(3) is also applied to AND-gate 1120 which is enabled on the next occurring inverse clock signal MC2. AND-gate 1120 outputs signal TSR1L1 (at time $T_8$ of waveform 2233 in FIG. 22). Signal TSR1L1 is applied to OR-gate 991 in FIG. 9 which causes input D of register 931 to accept the current BEGINFRAME#N. Simultaneously, the Q output of register 931 applies the prior BEGINFRAME#N signal, that is, the signal corresponding to the beginning frame of the largest energy signal pulse, to the minuend input of subtractor 901. The subtrahend input of subtractor 901 receives the current ENDFRAME#N signal, that is, the signal corresponding to the ending frame of the energy signal pulse preceding the largest energy signal pulse. The output of subtractor 901 is thus the distance in frames between the beginning of the largest energy signal pulse and the end of the energy signal pulse which precedes the largest energy signal pulse. The output of subtractor 901 is applied to the A input of comparator 911. Signal TEST# is applied from buffer 1030 (signal TEST# being equal to constant signal NSEP) to the B input of comparator 911. Buffer 1030 is enabled by signal S(3) via OR-gate 1090.

If A is less than B in comparator 911, that is, if the distance between the largest energy signal pulse and the preceding energy signal pulse is less than constant signal NSEP=6 frames, the A>B output of the comparator, signal GT1, is false. Thus, the preceding energy signal pulse is combined with the smoothed energy signal pulse previously generated in state one. The next inverse clock signal $\overline{MC2}$ decrements signal SADDRESS in up/down counter 851 to the next preceding energy and the comparison process is repeated. Preceding energy signal pulses wil thus be combined into the smoothed energy signal pulse until signal GT1 from comparator 911 goes true (at time $T_9$ of waveform 2235 in FIG. 22), that is, until an energy signal pulse is separated by more than constant signal NSEP=6 frames from a succeeding energy signal pulse.

Prior to time $T_9$, in FIG. 22, signal GT1 is false and inverse signal $\overline{GT1}$ from inverter 871 is true. Inverse signal $\overline{GT1}$ is applied to AND-gate 1121 which is enabled on inverse clock signal $\overline{MC2}$. AND-gate 1121 thereby outputs signal LD1R (at time $T_8$ in waveform 2234 of FIG. 22). Signal LD1R causes register 930 to store the output of subtractor 903. The output of subtractor 903 is the difference between the BEGINFRAME#N and ENDFRAME#N signals corresponding to the first energy signal pulse which comprises the smoothed energy signal pulse. Register 930 thus contains the length of the first energy signal pulse in the smoothed energy signal pulse.

Figure 15:
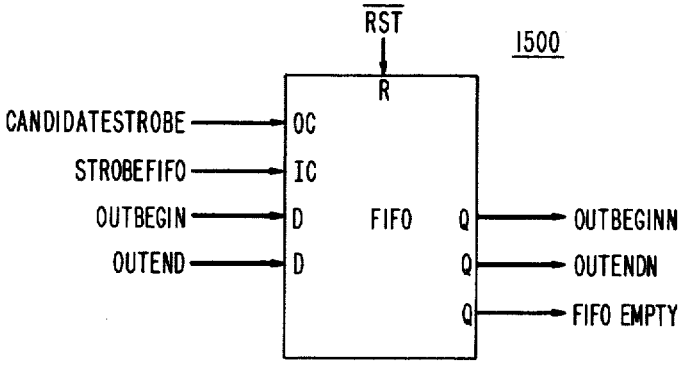
FIG. 15 shows a detailed block diagram of a candidate store that may be used in the endpoint detector of FIG. 1.

Signal LD1R is also applied to enable register 833 to receive input from data bus 801. Register 833 thus stores the SADDRESS signal corresponding to the first energy signal pulse in the smoothed energy signal pulse. When signal GT1 goes true (at time $T_9$ of waveform 2235 in FIG. 22), AND-gate 1122 applies a true signal on the rising edge of inverse clock signal $\overline{MC2}$ via OR-gate 1190 is one-shot 1160. One-shot 1160 thereby outputs signal STROBEFIFO (at time $T_{10}$ of waveform 2236). Referring to FIG. 15, signal STROBEFIFO enables first infirst out candidate store 1500 to store signals OUTBEGIN AND OUTEND in the number one candidate location. Canadidate store 1500 may be, for example, a Monolithic Memories, Corporation, model MM67401.

Signal OUTBEGIN is the output of register 931 which is equal to the BEGINFRAME#N signal corresponding to the first frame in the smoothed energy signal pulse. Since OUTEND is the output of register 932 and is equal to the ENDFRAME#N signal corresponding to the last frame in the smoothed energy signal pulse. Signals OUTBEGIN and OUTEND thus correspond to the endpoints of the smoothed energy signal pulse. The endpoints of the smoothed energy signal pulse are the top endpoint candidates, that is, they are considered most likely to yield correct recognition of the input utterance in a speech recognizer such as, utilization device 103.

Signal GT1 is also called signal NS4 in FIG. 11. Signal NS4 is applied via OR-gate 890 and AND-gate 823 to increment counter 852. The state of demultiplexer 880 is thereby modified and a state four signal S(4) (waveform 2302 in FIG. 23) is obtained at time $T_1$.

In FIG. 9, the output of register 930 is applied to the A input of comparator 910. Register 930 contains the length in frames of the first energy signal pulse in the smoothed energy signal pulse. The output of register 933 is applied to the B input of comparator 910. Register 933 contains the length in frames of the last energy signal pulse in the smoothed energy signal pulse.

Figure 13:
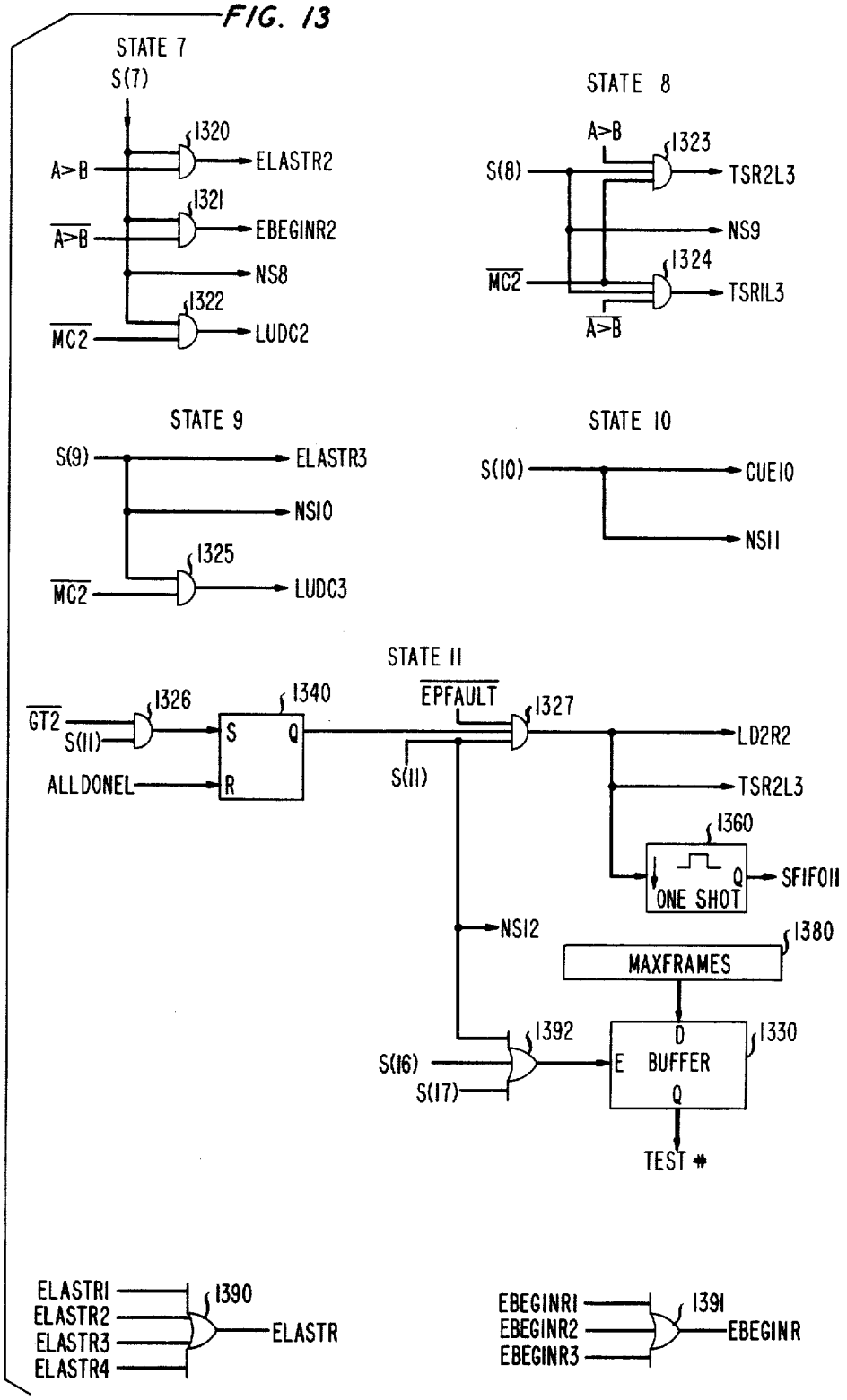

If the length of the first energy signal pulse is greater than the length of the last energy signal pulse, the A>B (condition 1 at time $T_2$ of waveform 2303 in FIG. 23) of comparator 910 is true, generating signal ELASTR1 (condition 1 of waveform 2304) from AND-gate 1123. Referring to FIG. 13, signal ELASTR1 is applied to OR-gate 1390 to generate signal ELASTR. ELASTR enables register 832 to apply the SADDRESS signal corresponding to the last energy signal pulse in the smoothed energy signal pulse to data bus 801.

In FIG. 11, signal S(4) causes AND-gate 1125 to output signal LUDC1 (waveform 2306 in FIG. 23) at time $T_3$ on inverse clock signal $\overline{MC2}$. Signal LUDC1 is applied via OR-gate 893 to load up/down counter 851 with the SADDRESS signal from data bus 801, that is, the address corresponding to the last energy signal pulse in the smoothed energy signal pulse.

If, on the other hand, the length of the last energy signal pulse is greater than or equal to the length of the first energy signal pulse, inverse signal $\overline{A>B}$ from inverter 970 is true, generating signal EBEGINR1 (condition 2 of waveform 2305 at time $T_2$). Signal EBEGINR1 is applied to OR-gate 1391 to generate signal EBEGINR. Signal EBEGINR enables register 833 to apply the SADDRESS signal corresponding to the first energy signal pulse in the smoothed energy signal pulse to data bus 801.

Signal S(4) causes AND-gate 1125 to output signal LUDC1 at time $T_3$ (waveform 2306 in FIG. 23) on inverse clock pulse $\overline{MC2}$. Signal LUDC1 is applied via OR-gate 893 to load up/down counter 851 with signal SADDRESS from data bus 801, that is, the address corresponding to the first energy signal pulse in the smoothed energy signal pulse.

Signal S(4) is also called signal NS5 in FIG. 11. Signal NS5 is applied via OR-gate 890 and AND-gate 823 to increment counter 852. The state of demultiplexer 880 is thereby modified and a state five signal S(5) (waveform 2312) is obtained at time $T_4$.

Referring to FIG. 12, signal S(5) is applied to AND-gates 1220 and 1221. A true signal $\overline{BADCUT}$, from inverter 870 as discussed below, is also applied to AND-gates 1220 and 1221. If signal A>B (condition 1 of waveform 2303 at time $T_2$) from comparator 910 is true, AND-gate 1220 outputs signal CDE5. Signal CDE5 (condition 1 of waveform 2315 at time $T_4$ in FIG. 23) is applied via OR-gate 895 and AND-gate 822 to decrement the SADDRESS signal in up/down counter 851. The decremented SADDRESS signal in up/down counter 851 thereby corresponds to the address of the energy signal pulse which precedes the last energy signal pulse in the smoothed energy signal pulse.

If, on the other hand, signal $\overline{A>B}$ from inverter 970 is true, AND-gate 1221 outputs signal CUE5. Signal CUE5 (condition 2 of waveform 2316 at time $T_4$ in FIG. 23) is applied via OR-gate 984 and AND-gate 821 to increment the SADDRESS signal in up/down counter 851. The SADDRESS signal in up/down counter 851 thereby corresponds to the address of the energy signal pulse which follows the first energy signal pulse in the smoothed energy signal pulse.

The function of signals $\overline{BADCUT}$ and $\overline{BADCUTH}$ is to inhibit further processing of an input utterance which contains only one energy signal pulse (and which has therefore only one set of endpoints). For the purpose of illustrating the operation of the present invention, it is assumed that the input utterance has at least five energy signal pulses, two of which precede and two of which succeed the largest energy signal pulse.

Inverse signal $\overline{BADCUT}$ is the output of inverter 870 in FIG. 8. The input of inverter 870 is connected to the A=B output of comparator 810. The SADDRESS signal corresponding to the largest energy signal pulse is applied from register 836 to the A input of comparator 810. The SADDRESS signal from data bus 801 is applied to the B input of comparator. Thus, if the address on the data bus were the same as the address corresponding to the largest energy signal pulse, inverse signal $\overline{BADCUT}$ would be false. AND-gates 1220 and 1221 would be thereby inhibited and the SADDRESS signal in up/down counter 851 would not change. Also, the D input of flip-flop 1240 would be false. Thus, when S(5) (at time $T_5$ in waveform 2312 of FIG. 23) goes false, the output of inverter 1270 would latch signal $\overline{BADCUTH}$ false in flip-flop 1240.

Under the assumed input, however, the address on the data bus is not equal to the address corresponding to the largest energy signal pulse and inverse signal $\overline{BADCUT}$ is true. AND-gates 1220 and 1221 are thereby enabled, and flip-flop 1240 latches signal $\overline{BADCUTH}$ true (at time $T_5$ in waveform 2314 of FIG. 23).

Signal S(5) is also called signal NS6 in FIG. 12. Signal NS6 is applied via OR-gate 890 and AND-gate 823 to increment counter 852. The state of demultiplexer 880 is thereby modified and a state six signal S(6) (waveform 2322) is obtained at time $T_5$.

In FIG. 12, signal S(6) is applied to AND-gates 1222 and 1223. Inverse signal $\overline{BADCUTH}$ is likewise applied to AND-gates 1222 and 1223, and also to AND-gate 1224.

If signal A>B from comparator 910 is true, AND-gate 1222 outputs a true signal, TSR2L2. Signal TSR2L2 (condition 1 at time $T_5$ of waveform 2323 in FIG. 23) is applied to OR-gate 992 which causes register 932 to output signal OUTEND. Signal OUTEND is equal to the ENDFRAME#N signal corresponding to the energy signal pulse preceding the last energy signal pulse within the smoothed energy signal pulse. Register 931 outputs signal OUTBEGIN which is equal to the BEGINFRAME#N signal corresponding to the smoothed energy signal pulse. Signals OUTBEGIN and OUTEND are thus the endpoints of a truncated energy signal pulse, that is, an energy signal pulse which comprises the smoothed energy signal pulse with the last energy signal pulse within the smoothed pulse removed.

If, on the other hand, inverse signal $\overline{A}>\overline{B}$ from inverter 970 is true, AND-gate 1223 outputs signal TSR1L2. Signal TSR1L2 (condition 2 at time $T_5$ of waveform 2324 in FIG. 23) is applied to OR-gate 991, clocking register 931 to output signal OUTBEGIN. Signal OUTBEGIN is equal to the BEGINFRAME#N signal corresponding to the energy signal pulse which follows the first energy signal pulse within the smoothed energy signal pulse. Register 932 outputs signal OUTEND, which corresponds to the ending point of the smoothed energy signal pulse. Signal OUTBEGIN and OUTEND are thus the endpoints of a truncated energy signal pulse which comprises the smoothed energy signal pulse with the first energy signal pulse within the smoothed pulse removed.

When signal S(6) goes false, (at time $T_6$ of waveform 2322 in FIG. 23) inverter 1271 outputs a true signal which enables AND-gate 1224. The output of AND-gate 1224 is applied to one-shot 1260 which produces signal SFIF06. Signal SFIF06 (waveform 2325) is applied to candidate store 1500 in FIG. 15 at time $T_6$ via OR-gate 1190 and one-shot 1160. Candidate store 1500 in FIG. 15 thereby receives the OUTBEGIN and OUTEND signals generated in state six. Signals OUTBEGIN and OUTEND are stored in the number two candidate position of candidate store 1500.

Signal S(6) is also called signal NS7 in FIG. 12. Signal NS7 is applied to increment counter 852 via OR-gate 890 and AND-gate 823. The state of demultiplexer 880 is thereby modified and a state seven signal S(7) (waveform 2403 in FIG. 24) from comparator 910 is obtained at time $T_1$.

In FIG. 13, signal S(7) is applied to AND-gates 1320, 1321 and 1322. If signal A>B (condition 1 of waveform 2402 in FIG. 24) from comparator 910 is true. AND-gate 1320 outputs true signal ELASTR2. ELASTR2 (condition 1 at time $T_1$ of waveform 2404) is applied via OR-gate 1390 to output the contents of register 832 onto data bus 801. Register 832 contains the SADDRESS signal corresponding to the last energy signal pulse within the smoothed pulse, that is, the energy signal pulse which was removed in state six.

If, on the other hand, inverse signal $\overline{A}>\overline{B}$ is true-,AND-gate 1324 outputs true signal EBEGINR2. Signal EBEGINR2 (condition 2 at time $T_1$ of waveform 2405 in FIG. 24) is applied via OR-gate 1391 to register 833. Register 833 outputs the SADDRESS signal corresponding to the first energy signal pulse within the smoothed energy signal pulse. This first energy signal pulse was the energy signal pulse removed in state six.

Figure 24:
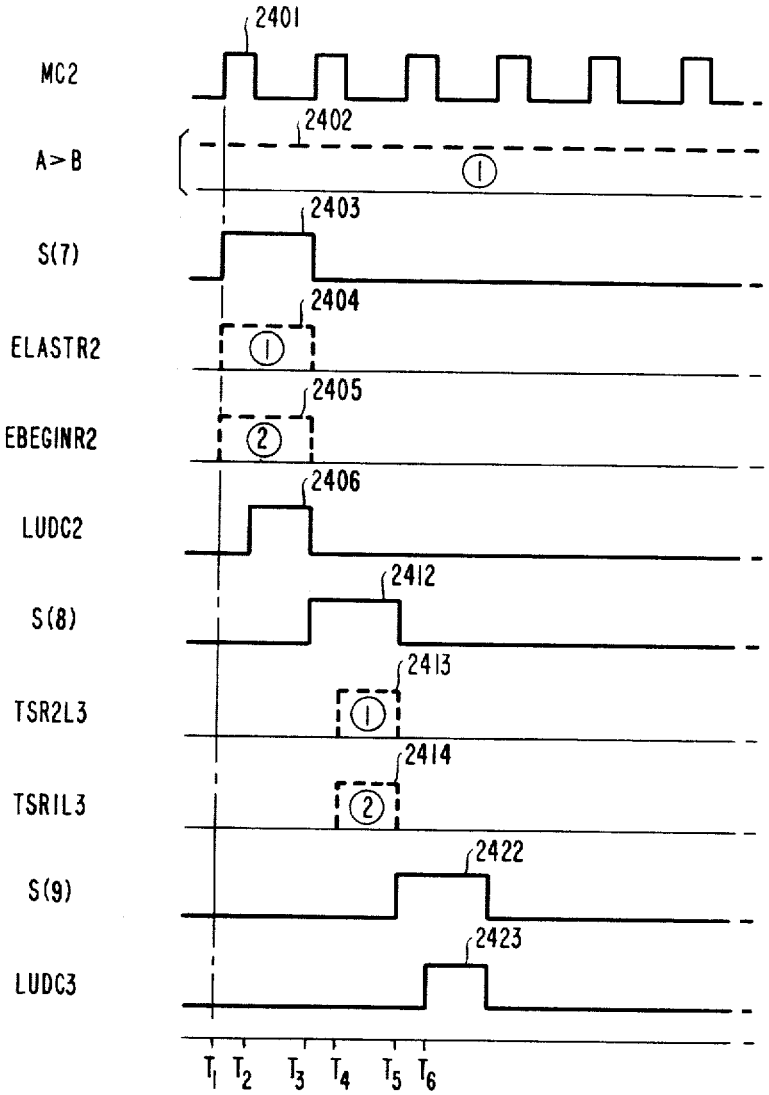
FIG. 24 shows waveforms illustrating the operation of the smoother and state apparatus of FIGS. 8, 9 and 13.
Figure 25:
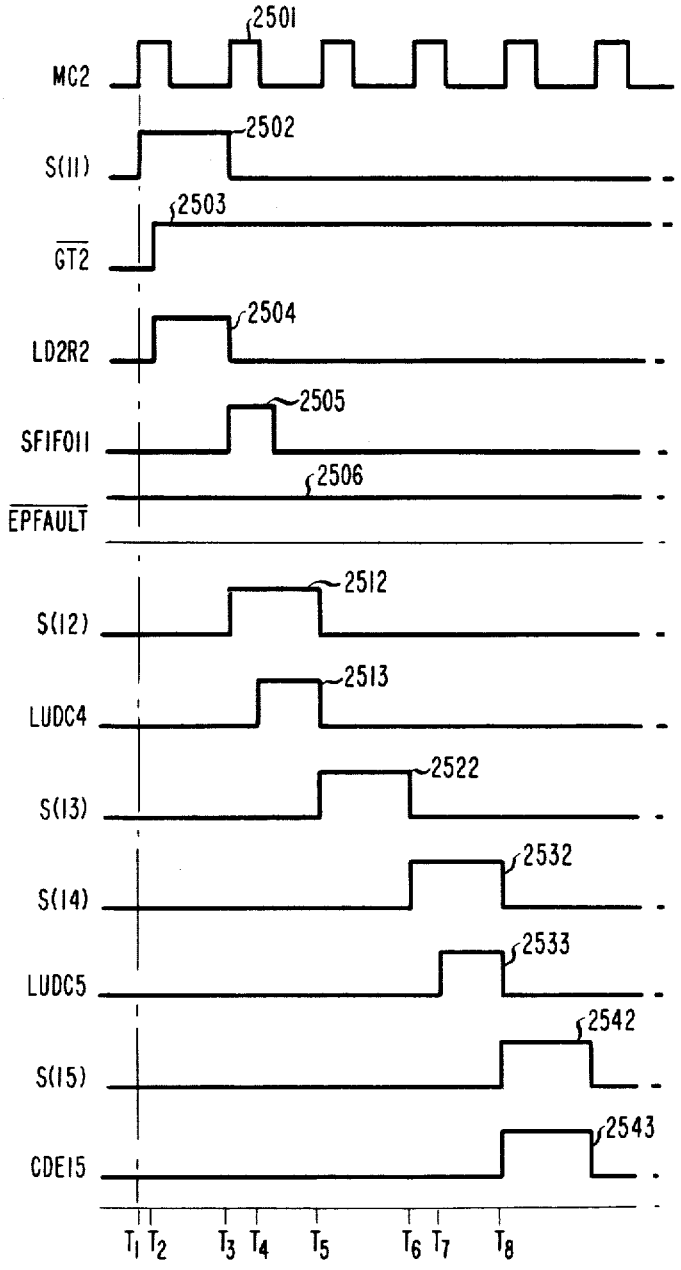
FIG. 25 shows waveforms illustrating the operation of the smoother and state apparatus of FIGS. 8, 9, 13 and 14 and the candidate store of FIG. 15.

On the rising edge of the next inverse clock signal $\overline{MC2}$, AND-gate 1322 is enabled to output signal LUDC2 (at time $T_2$ of waveform 2406 in FIG. 24). Signal LUDC2 is applied via OR-gate 893 to load the up/down counter 851 with the current SADDRESS signal from data bus 801, that is, the SADDRESS signal which corresponds to the pulse removed in state six.

Signal S(7) is also called signal NS8 in FIG. 13. Signal NS8 is applied to increment counter 852 via OR-gate 890 and AND-gate 823. The state of demultiplexer 880 is thereby moified and a state eight signal S(8) (waveform 2412 in FIG. 24) is obtained at time $T_3$.

In FIG. 13, signal S(8) is applied to AND-gates 1323 and 1324. If the length of the first energy signal pulse is greater than the length of the last energy signal pulse in the smoothed energy signal pulse, signal A>B (condition 1 of waveform 2402 in FIG. 24) from comparator 910 is true. AND-gate 1323 therefore outputs signal TSR2L3 when enabled by the next inverse clock signal $\overline{MC2}$. Signal TSR2L3 (condition 1 at time $T_4$ of waveform 2413 in FIG. 24) is applied to OR-gate 992 which causes register 932 to store the current ENDFRAME#N signal from RAM 830. RAM 830 outputs the ENDFRAME#N signal from the memory location specified by the SADDRESS signal on data bus 801.

Thus, register 932 is loaded with the ENDFRAME#N signal which corresponds to the last energy signal pulse within the smoothed energy signal pulse.

If, on the other hand, the length of the last energy signal pulse is greater than or equal to the length of the first energy signal pulse in the smoothed energy signal pulse, inverse signal $\overline{A>B}$ from inverter 970 is true (and signal A>B is false). AND-gate 1324 therefore outputs signal TSR1L3 (condition 2 at time $T_4$ of waveform 2414 in FIG. 24) when enabled by the next inverse clock signal $\overline{MC2}$. Signal TSR1L3 is applied to OR-gate 991 which causes register 931 to store the current BEGINFRAME#N signal from RAM 830. RAM 830 outputs the BEGINFRAME#N signal from the memory location specified by the SADDRESS signal on data bus 801. Thus, register 931 is loaded with the BEGINFRAME #N signal which corresponds to the first energy signal pulse within the smoothed energy signal pulse.

Signal S(8) is also called signal NS9 in FIG. 13. Signal NS9 is applied to increment counter 852 via OR-gate 890 and AND-gate 823. The state of demultiplexer 880 is thereby modified and a state nine signal S(9) (waveform 2422 in FIG. 24) is obtained at time $T_5$.

In FIG. 13, signal S(9) is also called signal ELASTR3.SIGNAL ELASTR3 is applied via OR-gate 1390 to output the SADDRESS signal stored in register 832 onto data bus 801. The current SADDRESS signal is thus the address corresponding to the last energy signal pulse within the smoothed energy signal pulse.

Signal S(9) is also applied to AND-gate 1325. On the next inverse clock signal $\overline{MC2}$, AND-gate 1325 outputs signal LUDC3. Signal LUDC3 (at time $T_6$ of waveform 2423 in FIG. 24) is applied via OR-gate 893 to load up/down counter 851 with the current SADDRESS signal from data bus 801, that is, the SADDRESS signal which corresponds to the last energy signal pulse within the smoothed energy signal pulse.

Signal S(9) is also called signal NS10 in FIG. 13. Signal NS10 is applied via OR-gate 890 and AND-gate 823 to increment counter 852. The state of demultiplexer 880 is thereby modified and a state ten signal S(10) is obtained.

In FIG. 13, signal S(10) is also called signal CUE10. Signal CUE10 is applied via OR-gate 894 and AND-gate 821 to increment the SADDRESS signal in up/down counter 851. The current SADDRESS signal thereby corresponds to the energy signal pulse which follows the smoothed energy signal pulse.

Signal S(10) is also called signal NS11 in FIG. 13. Signal NS11 is applied to increment counter 852 via OR-gate 890 and AND-gate 823. The state of demultiplexer 880 is thereby modified and a state eleven signal S(11) (waveform 2502 in FIG. 25) is obtained at time $T_1$.

In FIG. 13, signal S(11) is applied to AND-gates 1326 and 1327, and OR-gate 1392. OR-gate 1392 causes buffer 1330 to output the signal TEST#. Signal TEST#is equal to the constant signal MAXFRAMES. Signal MAXFRAMES may, for example, correspond to 10 frames. Signal MAXFRAMES may be supplied to buffer 1330 with a binary switch and constant voltage source 1380, as is well known in the art.

Signal TEST# is applied to the B input of comparator 912. Subtractor 902 applies the difference between the current BEGINFRAME#N signal and the prior ENDFRAME#N signal to the A input of comparator 912. Thus, if the distance between the end of the smoothed energy signal pulse (the prior ENDFRAME#N signal) and the beginning of the following energy signal pulse (the current BEGINFRAME#N signal) is less than or equal to the number of frames corresponding to signal MAXFRAMES, signal $\overline{GT2}$ (at time $T_2$ of waveform 2503 in FIG. 25) from comparator 912 is true. Signal $\overline{GT2}$ enables AND-gate 1326 which sets flip-flop 1340. A true signal from the Q output of flip-flop 1340 is applied to AND-gate 1327.

AND-gate 1327 is enabled when inverse signal $\overline{EP}$ $\overline{FAULT}$ (waveform 2506) from inverter 872 is true. The B>A output of comparator 811 is applied to inverter 872. The A input of comparator 811 is connected to data bus 801. The B input of comparator 811 is connected to the output of end register 831. End register 831 stores one plus the SADDRESS which corresponds to the last energy signal pulse in the input utterance. Therefore, if the current SADDRESS signal from data bus 801 is less than or equal to the SADDRESS signal which corresponds to the last energy signal pulse, signal $\overline{EPFAULT}$ is true.

For an input utterance in which no energy signal pulse follows the smoothed energy signal pulse, signal $\overline{EPFAULT}$ would be false. The operation of the circuitry in FIG. 13, state 11 would be thereby inhibited and no endpoint candidate formed therein. For the purposes of illustration below, however, it is assumed that the input utterance is one in which at least one energy signal pulse follows the smoothed energy signal pulse. Signal $\overline{EPFAULT}$ is therefore true and the circuitry of state 11 is operative to generate the third endpoint candidate signals.

AND-gate 1327 outputs signals LD2R2 and TSR2L3. Signal LD2R2 (at time $T_2$ of waveform 2504 in FIG. 25) is applied via OR-gate 891 to the C input of register 832 which stores the current SADDRESS signal from data bus 801. Signal TSR2L3 is applied via OR-gate 992 to clock the prior ENDFRAME#N signal out of register 932. The outputs of registers 931 and 932, signals OUTBEGIN and OUTEND, are applied to candidate store 1500. The falling edge output of AND-gate 1327 causes one-shot 1360 to generate signal SFIF011 (at time $T_3$ of waveform 2505). Signal SFIF011 is applied via OR-gate 1190 and one-shot 1160 to enable candidate store 1500 to accept signals OUTBEGIN and OUTEND into the third endpoint candidate location.

If, on the other hand, the distance between the end of the smoothed energy signal pulse and the beginning of the following energy signal pulse is greater than constant signal MAXFRAMES, signal $\overline{GT2}$ is false and no endpoint candidate is generated in state eleven.

Signal S(11) is also called signal NS12 in FIG. 13. Signal NS12 is applied via OR-gate 890 and AND-gate 823 to increment counter 852. The state of demultiplexer 880 is thereby modified and a state twelve signal S(12) (waveform 2512 in FIG. 25) is obtained at time $T_3$.

Figure 14:
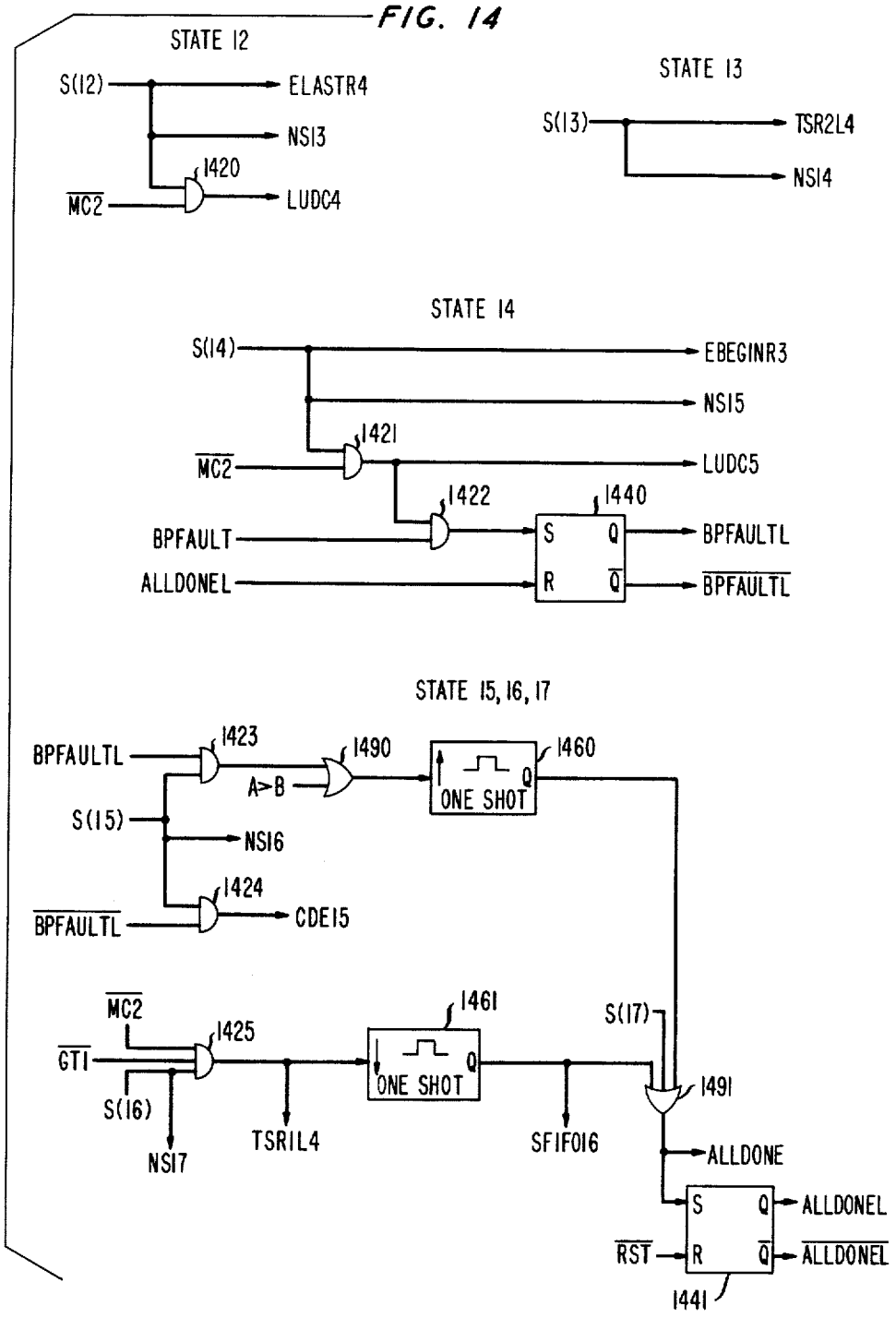
Figure 16:
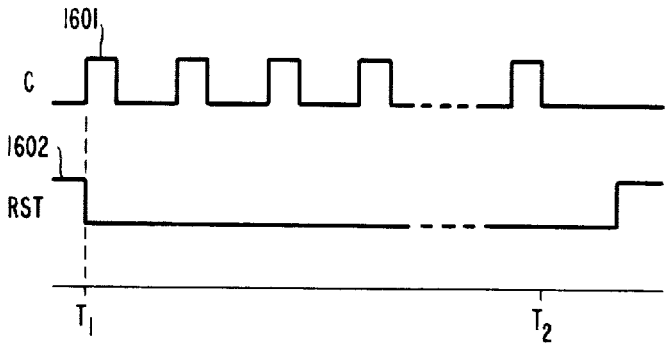
FIG. 16 shows waveforms illustrating the operation of the second level preprocessor of FIG. 2.

Referring to FIG. 14, signal S(12) is also called signal ELASTR4. ELASTR4 is applied via OR-gate 1390 to register 832. Register 832 is thereby enabled to output the SADDRESS signal corresponding to the last energy signal pulse within the smoothed energy signal pulse. This SADDRESS signal is applied to data bus 801

Signal S(12) is also applied to AND-gate 1420. AND-gate 1420 outputs signal LUDC4 (at time $T_4$ of waveform 2513 in FIG. 25) on the rising edge of inverse clock signal $\overline{MC2}$. Signal LUDC4 is applied via OR-gate 893 to load the current SADDRESS signal from data bus 801 into up/down counter 851. Up/down counter 851 thereby stores the SADDRESS signal which corresponds to the last energy signal pulse within the smoothed energy signal pulse.

Signal S(12) is also called signal NS13 in FIG. 14. Signal NS13 is applied via OR-gate 890 and AND-gate 823 to increment counter 852. The state of demultiplexer 880 is thereby modified and a state thirteen signal S(13) (waveform 2522 of FIG. 25) is obtained at time $T_5$.

In FIG. 14, signal S(13) is also called signals TSR2L4 and NS14. Signal TSR2L4 is applied via OR-gate 992 to input C of register 932. Register 932 thereby stores the current ENDFRAME#N signal from RAM 830. RAM 830 outputs signal ENDFRAME#N from the memory location specified by signal SADDRESS from data bus 801. This ENDFRAME#N signal corresponds to the ending frame of the smoothed energy signal pulse. Signal NS14 is applied via OR-gate 890 and AND-gate 823 to increment counter 852. The state of demultiplexer 880 is thereby modified and a state fourteen signal S(14) (waveform 2532 in FIG. 25) is obtained at time $T_6$.

In FIG. 14, signal S(14) is also called signal EBEGINR3. Signal EBEGINR3 is applied to OR-gate 1391 which outputs signal EBEGINR. Signal EBEGINR causes register 833 to apply the SADDRESS signal which corresponds to the first enery signal pulse within the smoothed energy signal pulse to data bus 801.

Signal S(14) is further applied to AND-gate 1421 which outputs signal LUDC5 (at time $T_7$ of waveform 2533 in FIG. 25) on the rising edge of inverse clock signal $\overline{MC2}$. Signal LUDC5 is applied via OR-gate 893 to load up/down counter 851 with the current SADDRESS signal from data bus 801, that is, the SADDRESS signal which corresponds to the first energy signal pulse within the smoothed energy signal pulse.

If the first energy signal pulse within the smoothed energy signal pulse is also the first energy signal pulse in the input utterance, signal BPFAULT is generated at the underflow output CD of up/down counter 851 in FIG. 8. Signal BPFAULT is applied along with signal LUDC5 from AND-gate 1421 to enable AND-gate 1422. The output of AND-gate 1422 is applied to set flip-flop 1440 which generates true signal BPFAULTL at the Q output of the flip-flop. Thus, if the SADDRESS signal which corresponds to the first energy pulse within the smoothed pulse is also the first energy signal pulse in the input utterance, signals BPFAULT and BPFAULTL are true. Signals BPFAULTL and S(15) are applied to AND-gate 1423 in FIG. 14. The output of AND-gate 1423 is applied to one-shot 1460. The output of one-shot 1460 is applied to OR-gate 1491 which outputs signal ALLDONE. Signal ALLDONE is applied to the set input of flip-flop 1441 which outputs signal ALLDONEL and inverse signal $\overline{ALLONEL}$. The operation of the circuitry in FIG. 14, state 16 is thereby inhibited and no endpoint candidate signals are formed therein. For the purposes of illustration below, however, it is assumed that the input utterance is one in which at least one energy signal pulse precedes the smoothed energy signal pulse. Signals BPFAULT and BPFAULTL are therefore false and the circuitry of FIG. 14, state 16 is operative to generate the fourth endpoint candidate signals.

Signal S(14) is also called signal NS15 in FIG. 14. Signal NS15 is applied via OR-gate 890 and AND-gate 823 to increment counter 852. The state of demultiplexer 880 is thereby modified and a state fifteen signal S(15) (waveform 2542) is obtained at time $T_8$.

Since signal BPFAULT is false, inverse signal $\overline{BPFAULTL}$ from flip-flop 1440 is true. Signals $\overline{BPFAULTL}$nd S(15) are applied to AND-gate 1424 which outputs signal CDE15 (at time $T_8$ of waveform 2543 in FIG. 25). Signal CDE15 is applied via OR-gate 895 and AND-gate 822 to decrement up/down counter 851. Up/down counter 851 thus contains the SADDRESS signal corresponding to the energy signal pulse that precedes the smoothed energy signal pulse.

Signal S(15) in FIG. 14 is also called signal NS16 Signal NS16 is applied via OR-gate 890 and AND-gate 823 to increment counter 852. The state of demultiplexer 880 is thereby modified and a state sixteen signal S(16) (waveform 2603 in FIG. 26) is obtained at time $T_1$.

In FIG. 13, signal S(16) is applied to OR-gate 1392. OR-gate 1392 enables buffer 1330 to output the signal TEST# which is equal to constant signal MAXFRAMES from generator 1380. Signal TEST# is applied to the B input of comparator 911. The A input of comparator 911 receives the output of subtractor 901. Subtractor 901 outputs the difference between the prior BEGINFRAME#N signal and the current ENDFRAME#N signal, that is, the distance in frames between the beginning of the smoothed energy signal pulse and the end of the energy signal pulse which precedes the smoothed energy signal pulse. If the difference from subtractor 901 is less than or equal to signalTEST#, signal GT1 from comparator 911 is false and inverse signal $\overline{GT1}$ from inverter 971 is true. For this illustration, it is assumed that inverse signal $\overline{GT1}$ is true. The energy signal pulse which precedes the smoothed energy signal pulse will therefore be combined with the smoothed energy signal pulse to form the fourth endpoint candidate signals.

In FIG. 14, signals $\overline{GT1}$ and S(16) are applied to AND-gate 1425. On the next inverse clock signal $\overline{MC2}$, AND-gate 1425 outputs signal TSR1L4. Signal TSR1L4 is applied via OR-gate 991 to register 931. Register 931 thereby outputs signal OUTBEGIN. Signal OUTBEGIN is equal to the BEGINFRAME#N signal which corresponds to the energy signal pulse which precedes the smoothed energy signal pulse.

The falling edge of signal TSR1L4 is applied to one-shot 1461 in FIG. 14. One-shot 1461 outputs signal SFIF016 (at time $T_2$ of waveform 2603 in FIG. 26). Signal SFIF016 is applied to OR-gate 1190 in FIG. 11 which causes one-shot 1160 to output signal STROBEFIFO. Signal STROBEFIFO enables RAM 1500 in FIG. 15 to store the current OUTBEGIN and OUTEND signals from registers 931 and 932 in the fourth endpoint candidate location.

Figure 26:
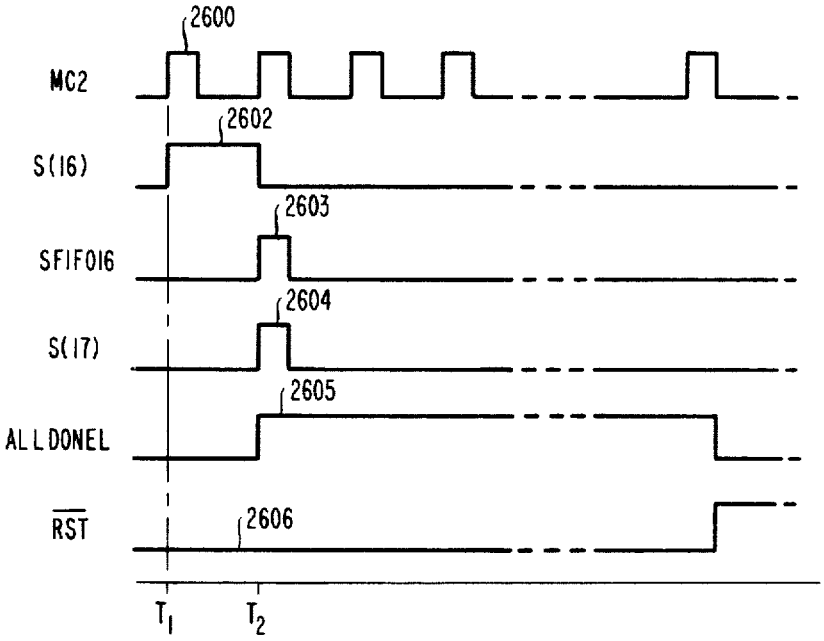
FIG. 26 shows waveforms illustrating the operation of the smoother and state apparatus of FIGS. 8, 9 and 14 and the candidate store of FIG. 15.

Signal SFIF016 is also applied to OR-gate 1491 in FIG. 14 which outputs signal ALLDONE (at time $T_2$ of waveform 2605 in FIG. 26). Signal ALLDONE is applied to input S of flip-flop 1441. Flip-flop 1441 thereby generates signal ALLDONEL at the Q output and inverse signal $\overline{ALLDONEL}$ at the $\overline{Q}$ output.

If on the other hand, the difference from subtractor 901 (i.e., the distance in frames from the beginning of the smoothed energy signal pulse to the end of the next preceding energy signal pulse) is greater than signal TEST# from buffer 1330, signal $\overline{GT1}$ from inverter 971 is false. AND-gate 1425 is thereby inhibited and no endpoint candidate signals are generated in the circuitry of FIG. 14, state 16.

Signal S(16) in FIG. 14 is also called signal NS17. Signal NS17 is applied via OR-gate 890 and AND-gate 823 to increment counter 852. The state of demultiplexer 880 is thereby modified and a state seventeen signal S(17) is obtained (waveform 2604 in FIG. 26) at time $T_2$.

In FIG. 14, signal S(17) is applied to OR-gate 1491, generating signal ALLDONE. Signal ALLDONE sets flip-flop 1441 which outputs signals ALLDONEL and $\overline{\text{ALLDONEL}}$.

In FIG. 1, utilization device 103 receives signal ALLDONEL from state control 1000, indicating that the first ranked endpoint candidate signals, OUTBEGINN and OUTENDN, are available from candidate store 1500. To retrieve successive endpoint candidate signals, utilization device 103 outputs signal CANDIDATESTROBE to candidate store 1500. When all the endpoint candidate signals have been retrieved, candidate store 1500 outputs control signal FIFOEMPTY to utilization device 103.

It will be recalled that utilization device 103 also receives control signals BEGINERROR, ENDERROR, SPEECHCK from flip-flops 441, 443, and 442 in FIG. 4, and signal PULSE#ERROR from address counter 850 in FIG. 8. When signals BEGINERROR, ENDERROR or PULSE#ERROR are true, or signal SPEECHCK is false, the input utterance is considered invalid and must therefore be repeated.

The preceding eighteen states generate from one to four endpoint candidate signals. It is to be understood, however, that further means may be provided in accordance with the invention to generate additional endpoint candidate signals. Advantageously, it has been found that the top three endpoint candidate signals provide at least a 4 to 6% increase in the average rate of correct recognition of the input utterance over prior endpoint detectors. Most significantly , the top three endpoint candidate signals reduce the average rate of rejection of the input utterance by almost 30%.

While the invention has been shown and described with reference to a preferred embodiment, it is to be understood that various modifications may be made by one skilled in the art without departing from the spirit and scope of the invention. For example, several thousand input devices 101, such as telephones, may be multiplexed to a plurality of preprocessors 102. The preprocessors 102 may be multiplexed to a single endpoint detector 150. The output of endpoint detector 150 may be demultiplexed to a plurality of utilization devices 103 to provide a computerized voice response system.

APPENDIX I

PROGRAM FOR SECOND LEVEL PREPROCESSOR

```
C PROGRAM: PREPROCESS
C
C INPUTS:
      E - ZEROTH ORDER AUTOCOR.
          ARRAY CONTAINING THE ENERGY
      L - THE NUMBER OF FRAMES IN
          THE RECORDING INTERVAL
C OUTPUTS:
      LV - AN INTERGER ARRAY CONTAINING
           LOG ENERGY
C
      DIMENSION E(L),LV(L)
      DIMENSION NLV(10)
```

APPENDIX I-continued

PROGRAM FOR SECOND LEVEL PREPROCESSOR

```
C
C READ IN DATA
C
      READ(DEVICE=0)(E(N),N=1,L)
C
C CONVERT ZEROTH ORDER AUTOCORRELATIONS
TO INTEGER VALUED
C LEVEL ARRAY OF LOG ENERGY
      LVMAX=-1000
      LVMIN=1000
      DO 30 N=1,L
      LVL=10.0*ALOG10(E(N))+0.5
      LVMAX=MAX(LVL,LVMAX)
      LVMIN=MIN(LVL,LVMIN)
      LV(N)=LVL
      CONTINUE
      IMAX=LVMAX-LVMIN
C
C NORMALIZE LEVEL ARRAY OF LOG ENERGIES BY
  LVMIN TO ELIMINATE ANY DC OFFSET
C
      DO 40 N=1,L
      LV(N)=LV(N)-LVMIN
40    CONTINUE
C
C MODE NORMALIZATION OF LEVEL ARRAY
C 3 POINT SMOOTHED HISTOGRAMS OF 10
  LOWEST LEVELS
C
      DO 50 M=1,10
50    NLV(M)=0
      DO 60 N=1,L
      LVL=LV(N)+1
      IF(LVLGT.10)GO TO 60
      NLV(LVL=NLV(LVL)+1
60    CONTINUE
      LVMAX=1
      NMAX=0
      DO 70 M=2,9
      NL=NLV(M-1)+NLV(M)+NLV(M+1)
      IF(NL.LE.NMAX)GO TO 70
      LVMAX=M
      NMAX=NL
70    CONTINUE
C
C SUBTRACT OUT THE MODE AND MAKE
  MINIMUM = 0
C
      DO 80 N=1,L
80    LV(N)=MAX(0,LV(N)-LVMAX+1)
C
C WRITE DATA TO OUTPUT CHANNEL
C
      WRITE(DEVICE=1)(LV(N),N=1,L)
      END
```

What is claimed is:

1. [Apparatus] *A speech recognizer including apparatus* for determining endpoints of [an applied] *a* speech utterance [in a noise prone environment comprising] *which comprises:* means for receiving [an input signal including a] *the* speech utterance;

means responsive to said [input signal] *speech utterance* for generating digital signals corresponding thereto;

means responsive to said digital signals for developing signals representative of the energy levels of said digital signals;

means responsive to said energy level signals for detecting the endpoints of said [applied] speech utterance; characterized in that said endpoint detecting means (150) comprises:

means (300, 500, 600, 700) responsive to said energy level signals for developing [a plurality of] *one or*

*more* energy signal pulses, [each] *said* energy signal [pulse] *pulses* corresponding to a sequence of said energy level signals which exceeds a prescribed level for at least a predetermined period of time; and means (800, 900, 1000) responsive to said energy signal pulses for developing [a plurality of] *one or more* endpoint candidate signals, [each of] said endpoint candidate signals being representative of probable beginning and ending points of said [applied] speech utterance.

2. [Apparatus] *A speech recognizer* as in claim 1 further characterized in that said means for developing energy signal pulses comprises:

means for generating first, second and third threshold signals each corresponding to a different predetermined speech energy level, said third threshold being intermediate said first and second thresholds;

means responsive to said energy level signals and said first threshold signal for generating a set of first indicator signals each representative of the first time at which each of said sequences of energy level signals exceeds said first threshold, each of said first indicator signals defining the beginning of an energy signal pulse;

means responsive to said energy level signals and said second threshold signal for modifying said first indicator signals each time at which any of said sequences of energy level signals exceed said second threshold more than a predetermined time after exceeding said first threshold, each of said modified first indicator signals redefining the beginning of an energy signal pulse;

means responsive to said energy level signals and said third threshold signal for generating a set of second indicator signals each representative of the first time at which each of said sequences of energy level signals declines below said third threshold, each of said second indicator signals defining the end of an energy signal pulse; and means responsive to said energy level signals and said second threshold signal for modifying said second indicator signals each time at which any of said sequences of energy level signals decline below said third threshold more than a predetermined time after declining below said second threshold, each of said modified second indicator signals redefining the end of an energy signal pulse.

3. [Apparatus] *A speech recognizer* as in claim 1 further characterized in that said means for developing endpoint candidate signals comprises:

means responsive to said energy signal pulses for selecting the energy signal pulse which includes the highest amplitude energy level signal; and means responsive to said energy signal pulses for combining according to predetermined criteria said energy signal pulse which includes the highest amplitude energy level signal together with other energy signal pulses, the beginning and end of each of said combined energy signal pulses defining said endpoint candidate signals.

4. A method for *recognizing speech that includes* determining endpoints of [an applied] *a* speech utterance [in a noise prone environment] comprising the steps of:

receiving [an input signal including a] *the* speech utterance;

generating digital signals corresponding to said [input signal] *speech utterance;* developing signals representative of the energy level of said digital signals;

[detecting] *determining* the endpoints of said [applied] speech utterance responsive to said energy level signals;

characterized in that said endpoint [detection] *determination* comprises the steps of:

developing [a plurality of] *one or more* energy signal pulses responsive to said energy level signals, [each] *said* energy signal [pulse] *pulses* corresponding to a sequence of said energy level signals which [exceeds] *exceed* a prescribed level for at least a predetermined period of time; and developing [a plurality of] *one or more* endpoint candidate signals responsive to said energy signal pulses, [each of] said endpoint candidate signals being representative of probable beginning and ending points of said [applied] speech utterance.

5. A method for *recognizing speech that includes* determining endpoints of [an applied] *a* speech utterance [in a noise prone environment] according to claim 4 further characterized in that said energy signal pulse developing step comprises:

generating first, second and third threshold signals each corresponding to a different predetermined speech energy level, said third threshold being intermediate said first and second thresholds;

generating a set of first indicator signals responsive to said energy level signals and said first threshold signal each representative of the first time at which each of said sequences of energy level signals exceeds said first thresholds, each of said first indicator signals defining the beginning of an energy signal pulse;

modifying said first indicator signals responsive to said energy level signals and said second threshold signal each time at which any of said sequences of energy level signals exceed said second threshold more than a predetermined time after exceeding said first threshold, each of said modified first indicator signals redefining the beginning of an energy signal pulse;

generating a set of second indicator signals responsive to said energy level signals and said third threshold signal each representative of the first time at which each of said sequences of energy level signals declines below said third threshold, each of said second indicator signals defining the end of an energy signal pulse; and modifying said second indicator signals each time at which any of said sequences of energy level signals decline below said third threshold more than a predetermined time after declining below said second threshold, each of said modified second indicator signals redefining the end of an energy signal pulse.

6. A method for *recognizing speech that includes* determining endpoints of [an applied]*a* speech utterance [in a noise prone environment] according to claim 4 further characterized in that said endpoint candidate signal developing step comprises:

selecting the energy signal pulse which includes the highest amplitude energy level signal responsive to said energy level pulses; and combining according to predetermined criteria said energy signal pulse which includes the highest amplitude energy level signal together with other energy signal pulses, the beginning and end of each of said combined energy signal pulses defining said endpoint candidate signals.

7. [Apparatus] *A speech recognizer which includes apparatus* for detecting endpoints of an applied speech utterance in a noise prone environment comprising: means for receiving an input signal including a speech utterance; means responsive to said input signal for generating digital signals corresponding thereto; means responsive to said digital signals for developing first signals representative of the energy levels of said digital signals; means responsive to said first energy level signals for selecting the lowest amplitude first energy level signal; means responsive to said first energy level signals for generating a three point histogram of the ten lowest amplitude first energy level signals; means responsive to said first energy level signals for generating second energy level signals by subtracting said lowest amplitude first energy level signal and said histogram signal from said first energy level signals; means responsive to said second energy level signals for developing a plurality of energy signal pulses, each energy signal pulse corresponding to a sequence of said second energy level signals which exceeds a prescribed level for at least a predetermined period of time; and means responsive to said energy signal pulses for developing a plurality of endpoint candidate signals, each of said endpoint candidate signals being representative of probable beginning and ending points of said applied speech utterance.

8. [Apparatus] *A speech recognizer* as in claim 7 further comprising means responsive to said second energy level signals for generating an error signal responsive to a second energy level signal at the beginning of said input signal being greater than a predetermined amplitude, whereby said error signal indicates that the input signal is invalid.

9. [Apparatus] *A speech recognizer* as in claim 7 further comprising means responsive to said second energy level signals for generating an error signal responsive to a second energy level signal at the end of said input signal being greater than a predetermined amplitude, whereby said error signal indicates that the input signal is invalid.

10. [Apparatus] *A speech recognizer* as in claim 7 further comprising means responsive to said second energy level signals for generating an error signal responsive to no second energy level signal representative of said input signal being greater than a predetermined amplitude, whereby said error signal indicates that the input signal is invalid.

11. [Apparatus] *A speech recognizer* as in claim 7 wherein said means for developing endpoint candidate signals comprises: means responsive to said energy signal pulses for selecting the energy signal pulse which includes the highest amplitude energy level signal; and means responsive to said energy signal pulses for combining said energy signal pulse which includes the highest amplitude energy level signal with adjacent energy signal pulses separated from each other by less than a prescribed time to form a smoothed energy signal pulse, whereby the beginning and end of said smoothed energy signal pulse defines one of said endpoint candidate signals.

12. [Apparatus] *A speech recognizer* as in claim 11 wherein said means for developing endpoint candidate signals comprises:

means responsive to said energy signal pulses for comparing the first energy signal pulse which forms the smoothed energy signal pulse and the last energy signal pulse which forms the smoothed energy signal pulse to detect the energy signal pulse of shorter duration; and means responsive to said smoothed energy signal pulse for removing said shorter duration energy signal pulse from said smoothed energy signal pulse to form a truncated energy signal pulse, whereby the beginning and end of said truncated energy signal pulse defines another of said endpoint candidate signals.

13. [Apparatus] *A speech recognizer* as in claim 12 wherein said means for developing endpoint candidate signals comprises:

means responsive to said energy signal pulses for combining said smoothed energy signal pulse with a succeeding energy signal pulse responsive to said succeeding energy signal pulse being separated by less than a predetermined time from said smoothed energy signal pulse, whereby the beginning and end of said combined smoothed and succeeding energy signal pulse defines another of said endpoint candidate signals.

14. [Apparatus] *A speech recognizer* as in claim 13 wherein said means for developing endpoint candidate signals further comprises: means responsive to said energy signal pulses for combining said smoothed energy signal pulse with a preceding energy signal pulse responsive to said preceding energy signal pulse being separated by less than a predetermined time from said smoothed energy signal pulse, whereby the beginning and end of said combined smoothed and preceding energy signal pulse defines another of said endpoint candidate signals.

15. A method for [detecting] *recognizing speech including determining* endpoints of an applied speech utterance in a noise prone environment comprising the steps of: receiving an input signal including a speech utterance; generating digital signals corresponding to said input signal; developing first signals representative of the energy levels of said digital signals; selecting the lowest amplitude first energy level signal responsive to said first energy level signals; generating a three point histogram of the ten lowest amplitude first energy level signals responsive to said first energy level signals; generating second energy level signals reponsive to said first energy level signals by subtracting said lowest amplitude first energy level signal and said histogram signal from said first energy level signals; developing a plurality of energy signal pulses responsive to said second energy level signals, each energy signal pulse corresponding to a sequence of said second energy level signals which exceeds a prescribed level for at least a predetermined period of time; and developing a plurality of endpoint candidate signals responsive to said energy signal pulses, each of said endpoint candidate signals being representative of probable beginning and ending points of said applied speech utterance.

16. A method for *recognizing speech including* determining endpoints of an applied speech utterance in a noise prone environment according to claim 15 further comprising the step of generating, responsive to said second energy level signals, an error signal responsive to a second energy level signal at the beginning of said input signal being greater than a predetermined amplitude, whereby said error signal indicates that the input signal is invalid.

17. A method for *recognizing speech including* determining endpoints of an applied speech utterance in a noise prone environment according to claim 15 further comprising the step of generating, responsive to said second energy level signals, an error signal responsive to a second energy level signal at the end of said input signal having greater than a predetermined amplitude, whereby said error signal indicates that the input signal is invalid.

18. A method for *recognizing speech including* determining endpoints of an applied speech utterance in a noise prone environment according to claim 15 further comprising the step of generating, responsive to said second energy level signals, an error signal responsive to no second energy level signal representative of said input signal being greater than a predetermined amplitude, whereby said error signal indicates that the input signal is invalid.

19. A method for *recognizing speech including* determining endpoints of an applied speech utterance in a noise prone environment according to claim 15 further comprising the steps of selecting, responsive to said energy signal pulses, the energy signal pulse which includes the highest amplitude energy level signal; and combining, responsive to said energy signal pulses, the energy signal pulse which includes the highest amplitude energy level signal with adjacent energy signal pulses separated from each other by less than a prescribed time to form a smoothed energy signal pulse, whereby the beginning and end of said smoothed energy signal pulse defines one of said endpoint candidate signals.

20. A method for *recognizing speech including* determining endpoints of an applied speech utterance in a noise prone environment according to claim 19 further comprising the steps of comparing, responsive to said energy signal pulses, the first energy signal pulse which forms the smoothed energy signal pulse and the last energy signal pulse which forms the smoothed energy signal pulse to detect the energy signal pulse of shorter duration; and removing, responsive to said smoothed energy signal pulse, said shorter duration energy signal pulse from said smoothed energy signal pulse to form a truncated energy signal pulse, whereby the beginning and end of said truncated energy signal pulse defines another of said endpoint candidate signals.

21. A method for *recognizing speech including* determining endpoints of an applied speech utterance in a noise prone environment according to claim 20 further comprising the step of combining, responsive to said energy signal pulses, said smoothed energy signal pulse with a succeeding energy signal pulse responsive to said succeeding energy signal pulse being separated by less than a predetermined time from said smoothed energy signal pulse, whereby the beginning and end of said combined smoothed and succeeding energy signal pulse defines another of said endpoint candidate signals.

22. A method for *recognizing speech including* determining endpoints of an applied speech utterance in a noise prone environment according to claim 21 further comprising the step of combining, responsive to said energy signal pulses, said smoothed energy signal pulse with a preceding energy signal pulse responsive to said preceding energy signal pulse being separated by less than a predetermined time from said smoothed energy signal pulse, whereby the beginning and end of said combined smoothed and preceding energy signal pulse defines another of said endpoint candidate signals.

* * * * *

UNITED STATES PATENT AND TRADEMARK OFFICE

CERTIFICATE OF CORRECTION

PATENT NO. : Re. 32,172

DATED : June 3, 1986

INVENTOR(S) : James D. Johnston, Lori F. Lamel, Lawrence R. Rabiner, Aaron E. Rosenberg and Jay G. Wilpon It is certified that error appears in the above-identified patent and that said Letters Patent is hereby corrected as shown below:

Column 5, line 56, "$LV_n$" should read --$L\hat{V}_n$--; line 60, "$LV_n$" should read --$L\hat{V}_n$--; line 61, "$LV_{min}$" should read --$L\hat{V}_{min}$--, "$LV_n$" should read --$L\hat{V}_n$--; line 62, "$LV_n$" should read --$L\tilde{V}_n$--; line 64, "$LV_n=LV_n-LV_{min}$, n=1,L" should read --$L\tilde{V}_n=L\hat{V}_n-L\hat{V}_{min}$, n=1,L--. Column 6, line 1, "$LV_n=LV_n-LV_{mode}$" should read --$LV_n=L\tilde{V}_n-L\tilde{V}_{mode}$--; line 3, "$LV_{mode}$" should read --$L\tilde{V}_{mode}$--; line 4, "$LV_n-LV_{mode}$" should read --$L\tilde{V}_n-L\tilde{V}_{mode}$--.

Signed and Sealed this

Seventh Day of April, 1987

*Attest:*

DONALD J. QUIGG

*Attesting Officer*

*Commissioner of Patents and Trademarks*